(12) United States Patent
Nakamura et al.

(10) Patent No.: US 8,787,187 B2
(45) Date of Patent: Jul. 22, 2014

(54) COMMUNICATION DEVICE, COMPUTER PROGRAM PRODUCT, AND COMMUNICATION METHOD

(75) Inventors: Mitsuru Nakamura, Nagoya (JP); Kenji Oike, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 302 days.

(21) Appl. No.: 13/221,978

(22) Filed: Aug. 31, 2011

(65) Prior Publication Data

US 2012/0051249 A1 Mar. 1, 2012

(30) Foreign Application Priority Data

Aug. 31, 2010 (JP) ................................ 2010-194014

(51) Int. Cl.
*G01R 31/08* (2006.01)
*H04L 12/26* (2006.01)

(52) U.S. Cl.
CPC ............ *H04L 43/0888* (2013.01); *H04L 43/10* (2013.01)
USPC ........... 370/252; 370/295; 370/343; 370/430; 455/69

(58) Field of Classification Search
None
See application file for complete search history.

(56) References Cited

U.S. PATENT DOCUMENTS

| 6,813,244 | B1 | 11/2004 | He et al. |
| 7,180,858 | B1 | 2/2007 | Roy et al. |
| 2010/0122141 | A1* | 5/2010 | Arye ............................ 714/752 |
| 2010/0185780 | A1* | 7/2010 | Sanjeewa ...................... 709/233 |
| 2011/0292949 | A1* | 12/2011 | Hayashi et al. ............... 370/419 |
| 2012/0106466 | A1* | 5/2012 | Kuusela et al. ............... 370/329 |
| 2013/0034012 | A1 | 2/2013 | Oshiba |

FOREIGN PATENT DOCUMENTS

| JP | 2002-199009 A | 7/2002 |
| WO | 2011/132783 A1 | 10/2011 |

OTHER PUBLICATIONS

Cao Le Thanh Man, et al, "Inline Network Measurement: TCP Built-in Techniques for Inferring End-to-end Bandwidth", Submitted to Graduate School of Information Sciene and Technology Osaka University, Jan. 2007, pp. 1-102.*

Tsugawa, Tomoaki, et al., "Implementation and evaluation of an inline network measurement algorithm and its application technique," Technical Report of the Institute of Electronics, Information and Communication Engineers, (IN2005-120), Dec. 2005, pp. 79-84.

(Continued)

*Primary Examiner* — Ian N Moore
*Assistant Examiner* — Latresa McCallum
(74) *Attorney, Agent, or Firm* — Banner & Witcoff, Ltd.

(57) ABSTRACT

A communication device transmits a plurality of measurement packets for identifying an available bandwidth to another communication device connected via a network, using bandwidths in the measurement bandwidth range. The communication device then determines whether the available bandwidth is included in the measurement bandwidth range. In a case where the available bandwidth is not included in the measurement bandwidth range, the communication device determines whether the available bandwidth is located on a narrowband side or on a wideband side with respect to the measurement bandwidth range, and determines a bandwidth shift amount based on an amount of change. The communication device updates the measurement bandwidth range by shifting one of the lower bandwidth and the upper bandwidth based on the bandwidth shift amount.

15 Claims, 10 Drawing Sheets

(56) References Cited

OTHER PUBLICATIONS

Cao Le Thanh Man, et al., "A study on Inline Network Measurement Mechanism for Service Overlay Networks," Technical Report of the Institute of Electronics, Information and Communication Engineers, Jan. 17, 2003, p. 53-58, vol. 102, No. 565.

Cao Le Thanh Man, et al., "Inline Bandwidth Measurement Techniques for Gigabit Networks", International Journal of Internet Protocol Technology (IJIPT) 2008. p. 81-94, vol. 3, No. 2.

Notification of Reasons for Rejection issued in corresponding Japanese Patent Application No. 2010-194014 dated Jul. 2, 2013.

* cited by examiner

R(n) : measurement bandwidth range
B(n) : bandwidth shift amount
CL(n) : lower bandwidth
CH(n) : upper bandwidth
WH : upper threshold value
WL : lower threshold value R(n) : measurement bandwidth range
B(n) : bandwidth shift amount
CL(n) : lower bandwidth
CH(n) : upper bandwidth
WH : upper threshold value
WL : lower threshold value R(n) : measurement bandwidth range
B(n) : bandwidth shift amount
CL(n) : lower bandwidth
CH(n) : upper bandwidth
WH : upper threshold value
WL : lower threshold value

COMMUNICATION DEVICE, COMPUTER PROGRAM PRODUCT, AND COMMUNICATION METHOD

CROSS-REFERENCE TO RELATED APPLICATION

This application claims priority to Japanese Patent Application No. 2010-194014, filed Aug. 31, 2010, the disclosure of which is hereby incorporated by reference in its entirety.

BACKGROUND

The present disclosure relates to a communication device, a computer program product, and a communication method that are capable of measuring an available bandwidth of a communication path between communication devices.

When a communication device transmits data via a network, such as the Internet, the communication device needs to transmit the data at a transmission rate that is appropriate for an available transmission capacity. Hereinafter, the transmission capacity and the transmission rate are also referred to as a "bandwidth". The available transmission capacity is referred to as an "available bandwidth". The available bandwidth varies depending on a region, a provider and conditions such as a time zone. Accordingly, it is desirable for the communication device to select a bandwidth when transmitting data, in accordance with the available bandwidth that varies.

A method is known that identifies the available bandwidth in the following manner. First, the communication device includes, in each of measurement packets, time information to calculate a transmission interval of the measurement packets. The communication device transmits the measurement packets continuously while gradually changing the transmission intervals and thereby changing the bandwidths used for transmission. Another communication device receives the measurement packets and stores reception intervals of the measurement packets. After that, a difference between the transmission interval, which is calculated from the time information in the received measurement packet, and the stored reception interval is calculated. The available bandwidth is identified from the tendency of change in values of the calculated plurality of differences.

The available bandwidth is identified for each range of a predetermined bandwidth. Hereinafter, the bandwidth range is referred to as a "measurement bandwidth range". The bandwidth that is used when transmitting the measurement packets is sequentially selected from within the measurement bandwidth range. The measurement packets are transmitted using the selected bandwidth, and it is determined whether or not the available bandwidth is included in the measurement bandwidth range. In a case where the available bandwidth is not included in the measurement bandwidth range, the measurement bandwidth range is extended. In a case where the available bandwidth is located on the narrowband side with respect to the measurement bandwidth range, the measurement bandwidth range is extended to the narrowband side. In a case where the available bandwidth is located on the wideband side with respect to the measurement bandwidth range, the measurement bandwidth range is extended to the wideband side.

SUMMARY

With the above-described method, the measurement bandwidth range is extended to the narrowband side or to the wideband side by a predetermined amount, and measurement of the available bandwidth is repeated. For that reason, if the measurement bandwidth range is significantly different from the available bandwidth, only after the measurement bandwidth range is repeatedly extended a number of times, the available bandwidth is included in the measurement bandwidth range. Therefore, it may take a long time until the available bandwidth is identified.

Various exemplary embodiments of the broad principles derived herein provide a communication device, a computer program product and a communication method that are capable of identifying an available bandwidth in a relatively short time.

Exemplary embodiments provide a communication device includes a transmission portion that, every time a measurement bandwidth range is one of identified and updated, transmits a plurality of measurement packets for identifying an available bandwidth to another communication device connected via a network, using bandwidths in the measurement bandwidth range, the measurement bandwidth range being a bandwidth range that is measured by the plurality of measurement packets, and the available bandwidth being a bandwidth that is available in the network. A first determination portion determines whether the available bandwidth is included in the measurement bandwidth range. A second determination portion, in a case where the first determination portion has determined that the available bandwidth is not included in the measurement bandwidth range, determines whether the available bandwidth is located on a narrowband side or on a wideband side with respect to the measurement bandwidth range. A shift amount determination portion determines a bandwidth shift amount based on an amount of change, the bandwidth shift amount being an amount of bandwidth shift when a lower bandwidth is shifted to the narrowband side in a case where the second determination portion has determined that the available bandwidth is located on the narrowband side with respect to the measurement bandwidth range, and being an amount of bandwidth shift when an upper bandwidth is shifted to the wideband side in a case where the second determination portion has determined that the available bandwidth is located on the wideband side with respect to the measurement bandwidth range, the amount of change indicating a magnitude of change in a case where the measurement bandwidth range is changed, the lower bandwidth being a narrowest bandwidth in the measurement bandwidth range, and the upper bandwidth being a widest bandwidth in the measurement bandwidth range. A first update portion updates the measurement bandwidth range by shifting one of the lower bandwidth and the upper bandwidth based on the bandwidth shift amount determined by the shift amount determination portion.

Exemplary embodiments further provide a computer program product stored on a non-transitory computer-readable medium includes instructions for causing a processor of a communication device to execute the steps of transmitting, every time a measurement bandwidth range is one of identified and updated, a plurality of measurement packets for identifying an available bandwidth to another communication device connected via a network, using bandwidths in the measurement bandwidth range, the measurement bandwidth range being a bandwidth range that is measured by the plurality of measurement packets, and the available bandwidth being a bandwidth that is available in the network, determining whether the available bandwidth is included in the measurement bandwidth range, determining, in a case where it has been determined that the available bandwidth is not included in the measurement bandwidth range, whether the available bandwidth is located on a narrowband side or on a wideband side with respect to the measurement bandwidth range, determining a bandwidth shift amount based on an amount of change, the bandwidth shift amount being an amount of bandwidth shift when a lower bandwidth is shifted to the narrowband side in a case where it has been determined that the available bandwidth is located on the narrowband side with respect to the measurement bandwidth range, and being an amount of bandwidth shift when an upper bandwidth is shifted to the wideband side in a case where it has been determined that the available bandwidth is located on the wideband side with respect to the measurement bandwidth range, the amount of change indicating a magnitude of change in a case where the measurement bandwidth range is changed, the lower bandwidth being a narrowest bandwidth in the measurement bandwidth range, and the upper bandwidth being a widest bandwidth in the measurement bandwidth range, and updating the measurement bandwidth range by shifting one of the lower bandwidth and the upper bandwidth based on the determined bandwidth shift amount.

Exemplary embodiments further provide a communication method, comprising the steps of transmitting, every time a measurement bandwidth range is one of identified and updated, a plurality of measurement packets for identifying an available bandwidth to another communication device connected via a network, using bandwidths in the measurement bandwidth range, the measurement bandwidth range being a bandwidth range that is measured by the plurality of measurement packets, and the available bandwidth being a bandwidth that is available in the network, determining whether the available bandwidth is included in the measurement bandwidth range, determining, in a case where it has been determined that the available bandwidth is not included in the measurement bandwidth range, whether the available bandwidth is located on a narrowband side or on a wideband side with respect to the measurement bandwidth range, determining a bandwidth shift amount based on an amount of change, the bandwidth shift amount being an amount of bandwidth shift when a lower bandwidth is shifted to the narrowband side in a case where it has been determined that the available bandwidth is located on the narrowband side with respect to the measurement bandwidth range, and being an amount of bandwidth shift when an upper bandwidth is shifted to the wideband side in a case where it has been determined that the available bandwidth is located on the wideband side with respect to the measurement bandwidth range, the amount of change indicating a magnitude of change in a case where the measurement bandwidth range is changed, the lower bandwidth being a narrowest bandwidth in the measurement bandwidth range, and the upper bandwidth being a widest bandwidth in the measurement bandwidth range, and, updating the measurement bandwidth range by shifting one of the lower bandwidth and the upper bandwidth based on the determined bandwidth shift amount.

BRIEF DESCRIPTION OF THE DRAWINGS

Exemplary embodiments will be described below in detail with reference to the accompanying drawings in which.

DETAILED DESCRIPTION OF THE EXEMPLARY EMBODIMENTS

Hereinafter, a communication device 1 that is an exemplary embodiment of a communication device of the present disclosure and a communication system 100 that includes a plurality of the communication devices 1 will be described with reference to the appended drawings.

Figure 1:
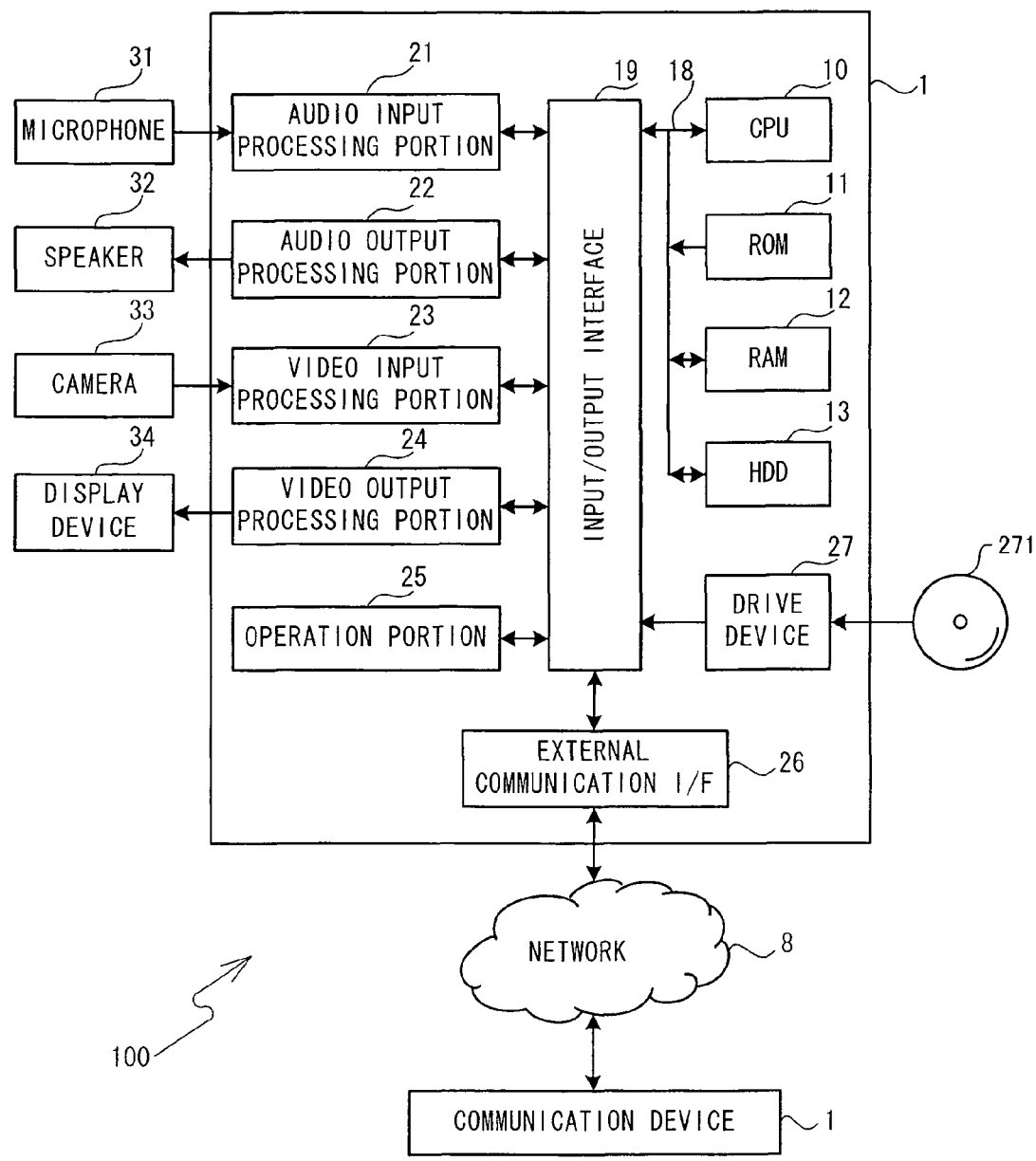
FIG. 1 is a diagram showing an overview of a communication system 100 and an electrical configuration of a communication device 1.

The communication system 100 will be described. As shown in FIG. 1, the communication system 100 includes at least two of the communication devices 1. The communication device 1 can connect to another of the communication devices 1 via a network 8 and can perform communication of various types of data with the other communication device 1.

The communication system 100 is a video conference system for users at a plurality of bases to perform a video conference. Each of the communication devices 1 mutually transmits and receives video data and audio data, and thus can share video and audio of the plurality of bases. It is sufficient if the communication device 1 can perform data communication via the network 8. Specifically, the communication device 1 may be a dedicated video conference terminal that is provided at each of the bases to perform video conferences, or may be a personal computer that performs various types of information processing.

In the communication system 100, the bandwidth is measured between the communication device 1 and the other communication device 1, and an available bandwidth is identified. The available bandwidth is a maximum transmission rate at which the receiving-side communication device 1 can receive data at substantially the same transmission rate as the transmission rate of the data transmitted by the transmission-side communication device 1. If a packet is transmitted at a transmission rate that exceeds the available bandwidth, packet loss, a communication delay and the like may occur. On the other hand, if the transmission rate is reduced too much, it is not possible to sufficiently use the available bandwidth and efficiency deteriorates. Accordingly, each of the communication devices 1 controls the bandwidth to be used, in accordance with the identified available bandwidth. Note that, "bps" is used as a bandwidth unit for the bandwidth and the transmission rate.

An electrical configuration of the communication device 1 will be described. As shown in FIG. 1, the communication device 1 is provided with a CPU 10 that controls the communication device 1. A ROM 11, a RAM 12, a hard disk drive (HDD) 13 and an input/output interface 19 are connected to the CPU 10 via a bus 18.

The ROM 11 stores initial values and the like. The RAM 12 temporarily stores various types of information used by a communication program. The HDD 13 is a non-volatile storage device that stores various types of programs, such as the communication program, and other information. The communication device 1 may use a storage device, such as an EEPROM or a memory card, in place of the HDD 13.

An audio input processing portion 21, an audio output processing portion 22, a video input processing portion 23, a video output processing portion 24, an operation portion 25, an external communication I/F 26 and a drive device 27 are connected to the input/output interface 19. The audio input processing portion 21 processes audio data output from a microphone 31. The audio output processing portion 22 controls operations of a speaker 32. The video input processing portion 23 processes video data output from a camera 33 that captures video. The video output processing portion 24 controls operations of a display device 34 that displays video. The operation portion 25 is used by a user to input various types of commands to the communication device 1. The operation portion 25 may be a portion that is connected to the input/output interface 19 from the outside of the communication device 1. The external communication I/F 26 connects the communication device 1 to the network 8. The drive device 27 can read out information stored in a storage medium 271. For example, when the communication device 1 is set up, the drive device 27 may read out a control program stored in the storage medium 271, and the control program may be stored in the HDD 13.

A bandwidth measurement method used in the communication system 100 of the present embodiment will be schematically described. The communication device 1 transmits a plurality of measurement packets to another of the communication devices 1 via the network 8. The other communication device 1 receives the measurement packets. Hereinafter, the communication device 1 that transmits the measurement packets is referred to as a "transmission device". The communication device 1 that receives the measurement packets is referred to as a "reception device". If the bandwidth (bps) that is used when the transmission device transmits measurement packets is equal to or less than the available bandwidth (bps), the measurement packets are not congested in the network 8. In this case, an interval at which the reception device receives the measurement packets transmitted by the transmission device is ideally the same as an interval at which the measurement packets are transmitted. Hereinafter, the interval at which the measurement packets are transmitted is referred to as a "transmission interval". The interval at which the measurement packets are received is referred to as a "reception interval". On the other hand, if the bandwidth that is used when measurement packets are transmitted is larger than the available bandwidth, the measurement packets are congested in the network 8, and the reception interval becomes longer than the transmission interval.

The transmission device gradually changes the transmission interval, and thereby changes the bandwidth used to transmit the measurement packets. In a time period during which the used bandwidth is larger than the available bandwidth, the reception interval is longer than the transmission interval. However, when the bandwidth used to transmit the measurement packets is equal to or less than the available bandwidth, the reception interval is the same as the transmission interval. The communication device 1 can identify, as the available bandwidth, the bandwidth at a point in time at which a relationship between the reception interval and the transmission interval changes.

Measurement procedures will be described. In the communication system 100, the bandwidth is roughly measured by the following procedures 1 to 3 and the available bandwidth is identified.

Procedure 1. Transmission and Reception of Measurement Packets

A predetermined measurement bandwidth range is identified by the transmission device. The measurement bandwidth range is a range of a predetermined bandwidth that is defined by two different bandwidths. A plurality of bandwidths that are used when measurement packets are transmitted are selected from among the bandwidths within the identified predetermined measurement bandwidth range. Hereinafter, the bandwidths that are used when measurement packets are transmitted are referred to as "measurement bandwidths". Data sizes and transmission intervals of the measurement packets that are transmitted using the respective measurement bandwidths are determined. The measurement packets are sequentially transmitted from the transmission device at the determined transmission intervals. The transmission intervals and the data sizes are stored in the measurement packets. The reception device receives the measurement packets.

Procedure 2. Identification of Available Bandwidth

After receiving a series of measurement packets, the reception device calculates reception intervals based on the times at which the measurement packets were received. Based on the transmission intervals stored in the measurement packets and the calculated reception intervals, values of "transmission interval/reception interval" are calculated. A point in time at which the values of "transmission interval/reception interval" change is identified. The transmission rate at the identified point in time is calculated based on a size of the measurement packet, and the calculated transmission rate is identified as the available bandwidth. In a case where the point in time at which the values of "transmission interval/reception interval" change is not detected, it is determined whether the available bandwidth is located on the wideband side with respect to the measurement bandwidth range, or the available bandwidth is located on the narrowband side with respect to the measurement bandwidth range. Information relating to the available bandwidth is stored in a result packet. The result packet is transmitted from the reception device to the transmission device. The transmission device receives the result packet.

Procedure 3. Update of Measurement Bandwidth Range

The transmission device updates the measurement bandwidth range based on information included in the received result packet. In a case where information indicating that the available bandwidth is included in the measurement bandwidth range is stored in the result packet, the measurement bandwidth range is reduced to a narrower range that includes the available bandwidth. In a case where information indicating that the available bandwidth is located on the narrowband side with respect to the measurement bandwidth range is stored in the result packet, the measurement bandwidth range is extended to the narrowband side. In a case where information indicating the available bandwidth is located on the wideband side with respect to the measurement bandwidth range is stored in the result packet, the measurement bandwidth range is extended to the wideband side.

The bandwidth is repeatedly measured by the procedures 1 to 3 based on the updated measurement bandwidth range, and it is thus attempted to identify the available bandwidth.

Figure 2:
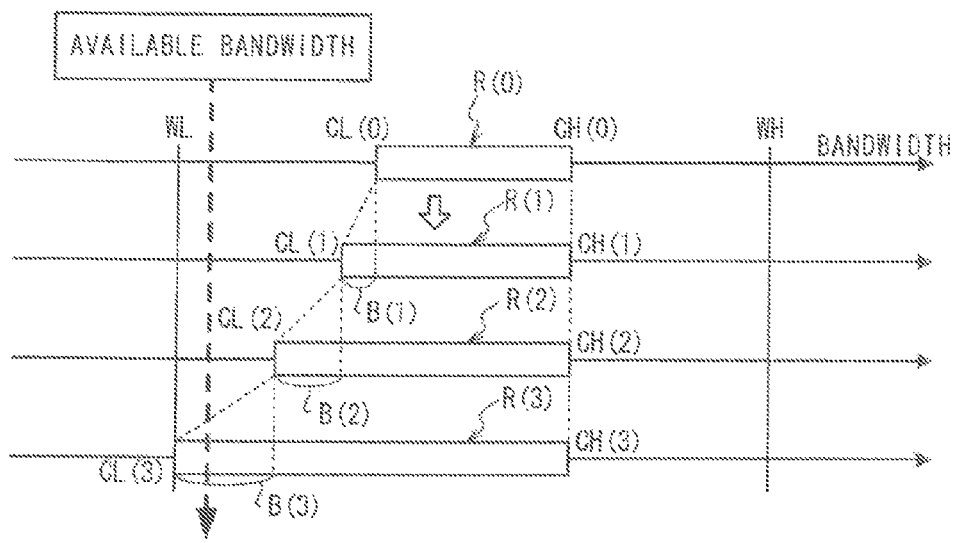
FIG. 2 is a diagram showing a manner in which a measurement bandwidth range varies.

A method for updating the measurement bandwidth range in the present disclosure will be described below. A method for updating the measurement bandwidth range in a case where it is determined that the available bandwidth is located on the narrowband side with respect to the measurement bandwidth range will be described with reference to FIG. 2. The measurement bandwidth range is also denoted by R (n). n is an integer. n can take a value of 0, 1, 2 . . . . The narrowest bandwidth in the measurement bandwidth range is referred to as a "lower bandwidth" and it is also denoted by CL (n). The widest bandwidth in the measurement bandwidth range is referred to as an "upper bandwidth" and it is also denoted by CH (n). When the measurement bandwidth range R (n) is updated, a shift amount when the upper bandwidth CH (n) or the lower bandwidth CL (n) is shifted is referred to as a "bandwidth shift amount" and it is also denoted by B (n). An amount of change is also denoted by M (n). The amount of change indicates the magnitude of change when the measurement bandwidth range is changed. More specifically, the amount of change indicates the magnitude of change when a past bandwidth shift amount is changed to a new bandwidth shift amount. The measurement bandwidth range R (n) can be shifted between a predetermined threshold value on the narrowband side and a predetermined threshold value on the wideband side. Hereinafter, the predetermined threshold value on the narrowband side is referred to as a "lower threshold value" and it is also denoted by WL. The predetermined threshold value on the wideband side is referred to as an "upper threshold value" and it is also denoted by WH.

The transmission device identifies a measurement bandwidth range R (0). A plurality of measurement bandwidths are selected from within the measurement bandwidth range R (0). Measurement packets are transmitted using the selected measurement bandwidths. The reception device receives the measurement packets and attempts to identify the available bandwidth. The reception device stores information relating to the available bandwidth in a result packet and transmits the result packet to the transmission device. The transmission device receives the result packet. Here, it is assumed that, based on the received result packet, the transmission device determines that the available bandwidth is located on the narrowband side with respect to the measurement bandwidth range R (0).

Since it is determined that the available bandwidth is located on the narrowband side with respect to the measurement bandwidth range R (0), the measurement bandwidth range R (0) is extended to the narrowband side. A lower bandwidth CL (0) is shifted to the narrowband side by a bandwidth shift amount B (1). The bandwidth shift amount B (1) is calculated by multiplying a width (CH (0)–CL (0)) of the measurement bandwidth range R (0) by an amount of change M (0).

$$B(1)=(CH(0)-CL(0))\times M(0)$$

Note that the upper bandwidth CH (0) is not changed and is maintained as it is. Thus, the measurement bandwidth range is updated to a measurement bandwidth range R (1) that is obtained by extending the measurement bandwidth range R (0) to the narrowband side by the bandwidth shift amount B (1).

Measurement packets are transmitted and received based on the updated measurement bandwidth range R (1), and it is attempted to identify the available bandwidth. It is assumed that the transmission device determines that the available bandwidth is located on the narrowband side with respect to the measurement bandwidth range R (1). In this case, the measurement bandwidth range R (1) is extended to the narrowband side. A lower bandwidth CL (1) is shifted to the narrowband side by a bandwidth shift amount B (2). The bandwidth shift amount B (2) is calculated by multiplying a width (CH (1)–CL (1)) of the measurement bandwidth range R (1) by an amount of change M (1).

$$B(2)=(CH(1)-CL(1))\times M(1)$$

The upper bandwidth CH (1) is not changed and is maintained as it is. Thus, the measurement bandwidth range is updated to a measurement bandwidth range R (2) that is obtained by extending the measurement bandwidth range R (1) to the narrowband side by the bandwidth shift amount B (2).

Similar processing is repeated and the measurement bandwidth range is further updated to a measurement bandwidth range R (3) that is obtained by extending the measurement bandwidth range R (2) to the narrowband side by a bandwidth shift amount B (3) (=(CH (2)–CL (2))×M (2)). Since the available bandwidth is included in the measurement bandwidth range R (3), the transmission device can identify the available bandwidth by measuring the available bandwidth based on the measurement bandwidth range R (3).

Note that, in a case where it is determined that the available bandwidth is located on the wideband side with respect to the measurement bandwidth range R (n), a bandwidth shift amount B (n+1) is calculated based on the amount of change M (n), using a method similar to the above-described method. The upper bandwidth CH (n) is shifted to the wideband side by the bandwidth shift amount B (n+1). The lower bandwidth CL (n) is not changed and is maintained as it is. Thus, the measurement bandwidth range is updated to a measurement bandwidth range R (n+1) that is obtained by extending the measurement bandwidth range R (n) to the wideband side by the bandwidth shift amount B (n+1).

In a case where it is continuously determined that the available bandwidth is located on the narrowband side or the wideband side with respect to the measurement bandwidth range R (n), the value of the amount of change M (n) is adjusted such that it increases in proportion to the increase in the value of n. Accordingly, the value of the bandwidth shift amount B (n) also increases in proportion to the value of n.

$$M(n)<M(n+1), B(n)<B(n+1)$$

In a case where it is continuously determined that the available bandwidth is located on the narrowband side or the wideband side with respect to the measurement bandwidth range, the communication device 1 gradually increases the amount of change M (n) and thereby gradually increases the bandwidth shift amount B (n). Thus, the communication device 1 increases the width of the measurement bandwidth range in a relatively short time. The possibility of identifying the available bandwidth increases in accordance with an increase in the width of the measurement bandwidth range. Therefore, the communication device 1 can identify the available bandwidth in a relatively short time.

Main processing that is performed by the CPU 10 of the transmission device among the communication devices 1 will be described with reference to FIG. 3 and FIG. 4. When the user inputs a command, via the operation portion 25, to measure the available bandwidth, the main processing is activated and performed by the CPU 10. The CPU 10 performs the main processing by reading and executing the communication program stored in the HDD 13. A variable "N_OVER" is used in the main processing. The variable N_OVER indicates a continuous number of times in a case where it is continuously determined that the available bandwidth is located on the narrowband side or the wideband side with respect to the measurement bandwidth range.

When the main processing is activated, first, a series of communication described below is performed (step S11). The measurement bandwidth range R (n) is identified. A plurality of measurement packets are transmitted to the reception device based on the identified measurement bandwidth range R (n). The reception device attempts to identify the available bandwidth. A result packet in which information relating to the available bandwidth is stored is transmitted from the reception device and is received by the transmission device. Hereinafter, the above-described series of communication is also referred to as "measurement communication".

Based on the information stored in the received result packet, it is determined whether or not the available bandwidth is included in the measurement bandwidth range R (n) (step S13). In a case where it is determined that the available bandwidth is included in the measurement bandwidth range R (n) (yes at step S13), 0 is substituted for the variable N_OVER and the variable N_OVER is initialized (step S15). The processing returns to step S11.

In a case where it is determined that the available bandwidth is not included in the measurement bandwidth range R (n) (no at step S13), a determination is made as to whether or not it has been continuously determined that the available bandwidth is located on the wideband side or the narrowband side with respect to the measurement bandwidth range R (n) (step S17). In a case where it has been continuously determined that the available bandwidth is located on the wideband side or the narrowband side with respect to the measurement bandwidth range R (n) (yes at step S17), 1 is added to the variable N_OVER and the variable N_OVER is updated (step S19). The processing proceeds to step S23. In a case where it has not been continuously determined that the available bandwidth is located on the wideband side or the narrowband side with respect to the measurement bandwidth range R (n) (no at step S17), 1 is substituted for the variable N_OVER (step S21). The processing proceeds to step S23.

The amount of change M (n) is identified in accordance with the value of the variable N_OVER. In a case where the variable N_OVER is 1 (yes at step S23), 0.5 is substituted for the amount of change M (n) (step S27). The processing proceeds to step S33. In a case where the variable N_OVER is 2 (no at step S23 and yes at step S25), 0.75 is substituted for the amount of change M (n) (step S29). The processing proceeds to step S33. In a case where the variable N_OVER is equal to or larger than 3 (no at step S25), 1.0 is substituted for the amount of change M (n) (step S31). The processing proceeds to step S33. In this manner, in a case where it is continuously determined that the available bandwidth is located on the narrowband side or the wideband side with respect to the measurement bandwidth range, the communication device 1 gradually increases the amount of change as the continuous number of times increases. Thus, as the continuous number of times increases, the communication device 1 gradually increases the bandwidth shift amount, which is calculated in a manner described below.

Note that, in the present embodiment, in a case where the variable N_OVER is equal to or larger than 3, 1.0 is substituted for the amount of change M (n) without exception. However, the present disclosure is not limited to this example. In a case where the variable N_OVER is equal to or larger than 3, the communication device 1 may identify the amount of change M (n) by multiplying the variable N_OVER by a predetermined value. By doing this, even in a case where the continuous number of times is equal to or larger than 3, the communication device 1 can increase the bandwidth shift amount in accordance with an increase of the continuous number of times.

It is determined whether or not the available bandwidth is located on the narrowband side with respect to the measurement bandwidth range R (n) with respect to the measurement bandwidth range R (n) (step S33). In a case where the available bandwidth is located on the narrowband side with respect to the measurement bandwidth range R (n) (yes at step S33), the lower bandwidth CL (n) of the measurement bandwidth range R (n) is shifted to the narrowband side in the following manner. Thus, the new measurement bandwidth range R (n+1) is identified.

The bandwidth shift amount B (n+1) is calculated and determined based on the upper bandwidth CH (n), the lower bandwidth CL (n) and the amount of change M (n) (step S35).

$$B(n+1)=(CH(n)-CL(n))\times M(n)$$

By subtracting the calculated bandwidth shift amount B (n+1) from the lower bandwidth CL (n), the lower bandwidth CL (n) is shifted to the narrowband side by the bandwidth shift amount B (n+1).

$$CL(n+1)=CL(n)-B(n+1)=CL(n)-(CH(n)-CL(n))\times M(n)$$

The upper bandwidth CH (n) is not changed and is maintained as it is. Therefore, the upper bandwidth CH (n) is used as it is, as an upper bandwidth CH (n+1). The new measurement bandwidth range R (n+1) is identified, which is defined by the calculated lower bandwidth CL (n+1) and the upper bandwidth CH (n+1). The measurement bandwidth range R (n) used for the measurement communication (refer to step S11) is updated to the new measurement bandwidth range R (n+1) (step S39). The processing proceeds to step S43.

On the other hand, in a case where the available bandwidth is located on the wideband side with respect to the measurement bandwidth range R (n) (no at step S33), the upper bandwidth CH (n) of the measurement bandwidth range R (n) is shifted to the wideband side in the following manner. Thus, the new measurement bandwidth range R (n+1) is identified.

The bandwidth shift amount B (n+1)=(CH (n)−CL (n))×M (n) is calculated and determined based on the upper bandwidth CH (n), the lower bandwidth CL (n) and the amount of change M (n) (step S37). By adding the calculated bandwidth shift amount B (n+1) to the upper bandwidth CH (n), the upper bandwidth CH (n) is shifted to the wideband side by the bandwidth shift amount B (n+1).

$$CH(n+1)=CH(n)+B(n+1)=CH(n)+(CH(n)-CL(n))\times M(n)$$

The lower bandwidth CL (n) is not changed and is maintained as it is. Therefore, the lower bandwidth CL (n) is used as it is, as the lower bandwidth CL (n+1). The new measurement bandwidth range R (n+1) is identified, which is defined by the calculated upper bandwidth CH (n+1) and the lower bandwidth CL (n+1). The measurement bandwidth range R (n) used for the measurement communication (refer to step S11) is updated to the new measurement bandwidth range R (n+1) (step S41). The processing proceeds to step S43.

At step S43, in order for the new measurement bandwidth range R (n+1) to fall within a range between the lower threshold value WL and the upper threshold value WH, processing that changes, as necessary, the lower bandwidth CL (n+1) and the upper bandwidth CH (n+1) of the new measurement bandwidth range R (n+1) (update processing, refer to FIG. 4) is performed (step S43).

The update processing will be described with reference to FIG. 4. It is determined whether or not the new measurement bandwidth range R (n+1) has been identified by extending the measurement bandwidth range R (n) to the narrowband side (step S51). In a case where the new measurement bandwidth range R (n+1) has been identified by extending the measurement bandwidth range R (n) to the narrowband side (yes at step S51), it is determined whether or not the lower bandwidth CL (n+1) of the new measurement bandwidth range R (n+1) is smaller than the lower threshold value WL (step S52). If the lower bandwidth CL (n+1) is smaller than the lower threshold value WL (yes at step S52), it means that the lower bandwidth is beyond the lower threshold value WL to the narrowband side. In order for the lower bandwidth CL (n+1) to fall within the range between the lower threshold value WL and the upper threshold value WH, the lower threshold value WL is substituted for the lower bandwidth CL (n+1), and the lower bandwidth CL (n+1) is thereby changed (step S53). The update processing ends and the processing returns to the main processing (refer to FIG. 3). On the other hand, if the lower bandwidth CL (n+1) is equal to or larger than the lower threshold value WL (no at step S52), the lower bandwidth CL (n+1) is located between the lower threshold value WL and the upper threshold value WH. Therefore, the update processing ends and the processing returns to the main processing (refer to FIG. 3).

In a case where the new measurement bandwidth range R (n+1) has been identified by extending the measurement bandwidth range R (n) to the wideband side (no at step S51), it is determined whether or not the upper bandwidth CH (n+1) of the new measurement bandwidth range R (n+1) is larger than the upper threshold value WH (step S58). If the upper bandwidth CH (n+1) is larger than the upper threshold value WH (yes at step S58), it means that the upper bandwidth is beyond the upper threshold value WH to the wideband side. In order for the upper bandwidth CH (n+1) to fall within the range between the lower threshold value WL and the upper threshold value WH, the upper threshold value WH is substituted for the upper bandwidth CH (n+1), and the upper bandwidth CH (n+1) is thereby changed (step S59). The update processing ends and the processing returns to the main processing (refer to FIG. 3). On the other hand, if the upper bandwidth CH (n+1) is equal to or smaller than the upper threshold value WH (no at step S58), the upper bandwidth CH (n+1) is located between the lower threshold value WL and the upper threshold value WH. Therefore, the update processing ends and the processing returns to the main processing (refer to FIG. 3).

Figure 3:
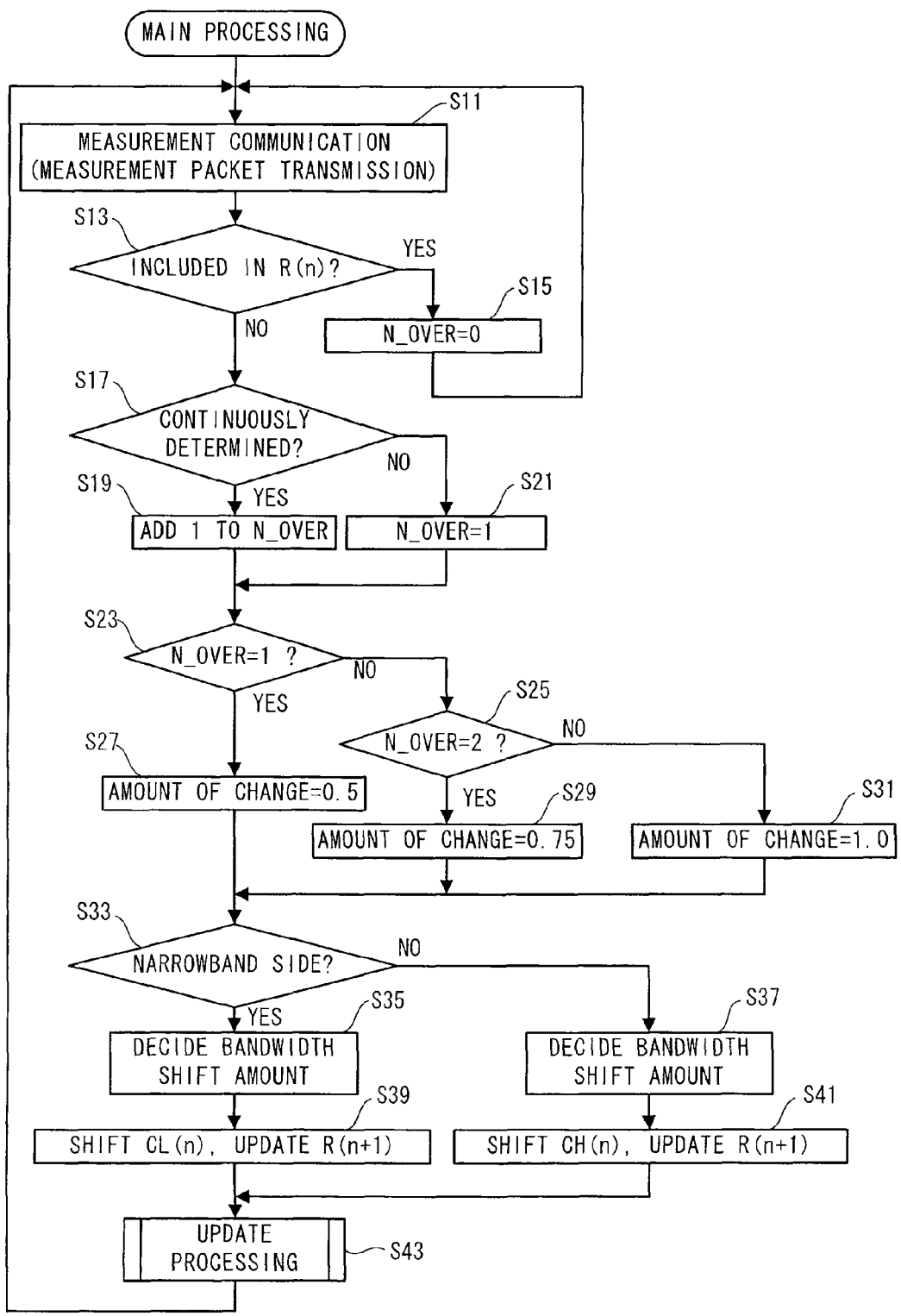
FIG. 3 is a flowchart showing main processing.
Figure 4:
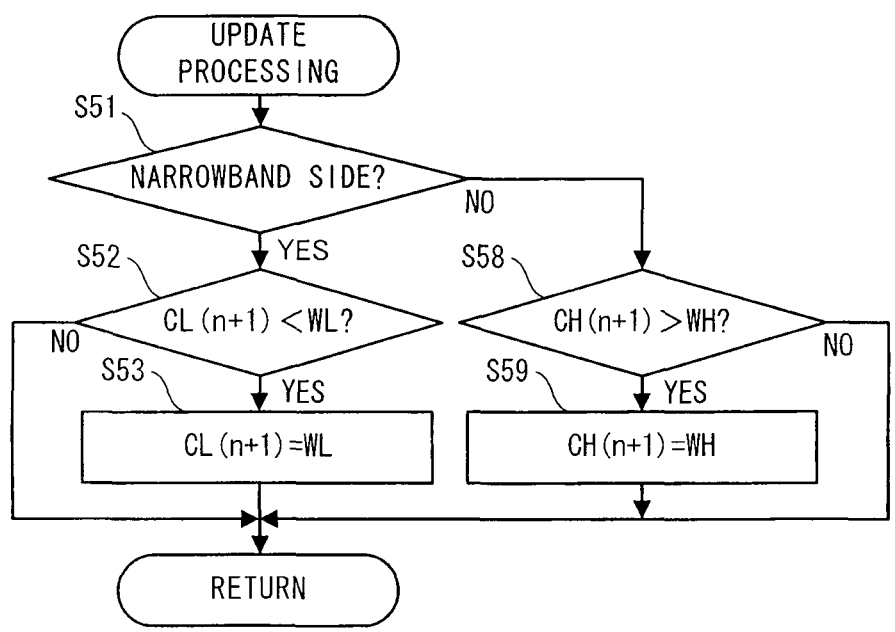
FIG. 4 is a flowchart showing update processing.

As shown in FIG. 3, after the update processing ends (step S43), the processing returns to step S11 in the main processing. The measurement communication is repeatedly performed based on the updated new measurement bandwidth range R (n+1). Since the amount of change M (n) gradually increases as the variable N_OVER increases, the bandwidth shift amount B (n) also gradually increases as the amount of change M (n) increases. As a result, the width of the measurement bandwidth range R (n) increases in a relatively short time.

As described above, the communication device 1 determines the bandwidth shift amount based on the amount of change that is adjusted in accordance with a positional relationship between the measurement bandwidth range and the available bandwidth. Specifically, in a case where it is continuously determined that the available bandwidth is located on the narrowband side or the wideband side with respect to the measurement bandwidth range, the amount of change is gradually increased so that the bandwidth shift amount, which is an increment of the measurement bandwidth range, is gradually increased. Thus, the communication device 1 can increase the width of the measurement bandwidth range in a relatively short time. Therefore, even in a case where the original measurement bandwidth range is significantly away from the available bandwidth, the communication device 1 can identify the available bandwidth in a relatively short time.

Note that the present disclosure is not limited to the above-described embodiment and various modifications are possible. In the above-described embodiment, the amount of change in a case where the measurement bandwidth range is extended to the narrowband side is the same as that in a case where the measurement bandwidth range is extended to the wideband side. Accordingly, also the bandwidth shift amount in a case where the measurement bandwidth range is extended to the narrowband side is the same as that in a case where the measurement bandwidth range is extended to the wideband side. However, the present disclosure is not limited to this example. An increment of the amount of change with respect to the previous amount of change in a case where it is continuously determined that the available bandwidth is located on the narrowband side with respect to the measurement bandwidth range may be larger than an increment of the amount of change with respect to the previous amount of change in a case where it is continuously determined that the available bandwidth is located on the wideband side with respect to the measurement bandwidth range. In other words, the amount of change may be determined such that the bandwidth shift amount in a case where the measurement bandwidth range is extended to the narrowband side is larger than the bandwidth shift amount in a case where the measurement bandwidth range is extended to the wideband side.

If the available bandwidth is located on the narrowband side with respect to the measurement bandwidth range, it means that measurement packets are being transmitted using a bandwidth that exceeds the available bandwidth. Therefore, the measurement communication imposes an excessive communication load on the network. In order to reduce the excessive communication load as soon as possible, it may be necessary to identify the available bandwidth more rapidly. Therefore, the communication device 1 may increase the amount of change to be relatively large in a case where the measurement bandwidth range is extended to the narrowband side, as compared to in a case where the measurement bandwidth range is extended to the wideband side. Thus, the bandwidth shift amount of the lower bandwidth becomes larger than the bandwidth shift amount of the upper bandwidth. Accordingly, the communication device 1 can increase the width of the measurement bandwidth range in a shorter time, and it is therefore possible to identify the available bandwidth in a shorter time. The communication device 1 can reduce the excessive load imposed by the measurement communication at an early timing.

On the other hand, if the available bandwidth is located on the wideband side with respect to the measurement bandwidth range, it means that measurement packets are being transmitted using a bandwidth that is smaller than the available bandwidth. In this case, since other bandwidths are available on the network, the necessity to rapidly identify the available bandwidth may be low. Therefore, the amount of change in a case where the measurement bandwidth range is extended to the wideband side may be made smaller than the amount of change in a case where the measurement bandwidth range is extended to the narrowband side. By doing this, the bandwidth shift amount of the upper bandwidth is made smaller than the bandwidth shift amount of the lower bandwidth. As a result, the change of the measurement bandwidth range on the wideband side is smaller than that on the narrowband side.

Further, the measurement bandwidth range may be extended to the narrowband side only in a case where it is continuously determined that the available bandwidth is located on the narrowband side with respect to the measurement bandwidth range. The measurement bandwidth range need not necessarily be extended in a case where it is continuously determined that the available bandwidth is located on the wideband side with respect to the measurement bandwidth range. By doing this, the width of the measurement bandwidth range is more likely to be maintained in a narrow state. Therefore, an increase of the bandwidth occupied by communication of measurement packets can be inhibited more efficiently.

First modified embodiment

Hereinafter, a first modified embodiment will be described. The first modified example shows processing that is performed in a case where the available bandwidth is located on the narrowband side with respect to the lower threshold value WL, and in a case where the available bandwidth is located on the wideband side with respect to the upper threshold value WH. In the first modified embodiment, in a case where the lower bandwidth CL (n+1) becomes smaller than the lower threshold value WL as a result of the measurement bandwidth range R (n) being updated to the new measurement bandwidth range R (n+1), the upper bandwidth CH (n+1) is shifted to the narrowband side so as to reduce the width of the new measurement bandwidth range R (n+1). Further, in a case where the upper bandwidth CH (n+1) becomes larger than the upper threshold value WH, the lower bandwidth CL (n+1) is shifted to the wideband side so as to reduce the width of the new measurement bandwidth range R (n+1). Thus, the communication device 1 can inhibit an increase in time required for measurement communication due to an excessively wide width of the measurement bandwidth range.

A method for updating the measurement bandwidth range R (n) in a case where it is determined that the available bandwidth is located on the narrowband side with respect to the measurement bandwidth range R (0) will be described with reference to FIG. 5. The available bandwidth is located on the narrowband side with respect to the lower threshold value WL. The transmission device identifies the measurement bandwidth range R (0). A plurality of measurement bandwidths are selected from within the measurement bandwidth range R (0). The measurement communication is performed based on the selected measurement bandwidths and it is attempted to identify the available bandwidth. Here, it is assumed that it is determined that the available bandwidth is located on the narrowband side with respect to the measurement bandwidth range R (0). The lower bandwidth CL (0) of the measurement bandwidth range R (0) is shifted to the narrowband side by the bandwidth shift amount B (1). The upper bandwidth CH (0) is not changed and is maintained as it is. The measurement bandwidth range is updated to the measurement bandwidth range R (1) obtained by extending the measurement bandwidth range R (0) to the narrowband side by the bandwidth shift amount B (1). The measurement communication is performed based on the updated measurement bandwidth range R (1), and it is attempted to identify the available bandwidth. By repeating the above-described processing, the measurement bandwidth range is extended to the narrowband side in order of the bandwidth shift amounts B (2) and B (3), and is updated in order of the measurement bandwidth ranges R (2) and R (3). The processing so far is the same as that of the above-described embodiment.

It is assumed that, since a lower bandwidth CL (3) of the measurement bandwidth range R (3) is close to the lower threshold value WL, in a case where the measurement bandwidth range is updated to a measurement bandwidth range R (4) in a similar manner, a lower bandwidth CL (4) becomes smaller than the lower threshold value WL. In this case, the lower bandwidth CL (4) of the updated measurement bandwidth range R (4) is fixed at the lower threshold value WL. Instead, an upper bandwidth CH (3) is shifted to the narrowband side by a bandwidth shift amount B (4), and an upper bandwidth CH (4) is thereby identified. The width of the measurement bandwidth range R (4) is narrower than that of the measurement bandwidth range R (3). The measurement communication is performed based on the measurement bandwidth range R (4), and it is attempted to identify the available bandwidth. It is determined that the available bandwidth is located on the narrowband side with respect to the measurement bandwidth range R (4). A lower bandwidth CL (5) is fixed at the lower threshold value WL. Instead, the upper bandwidth CH (4) is shifted to the narrowband side by a bandwidth shift amount B (5), and an upper bandwidth CH (5) is thereby identified. The width of a measurement bandwidth range R (5) is further narrower than the widths of the measurement bandwidth ranges R (3) and R (4).

Figure 5:
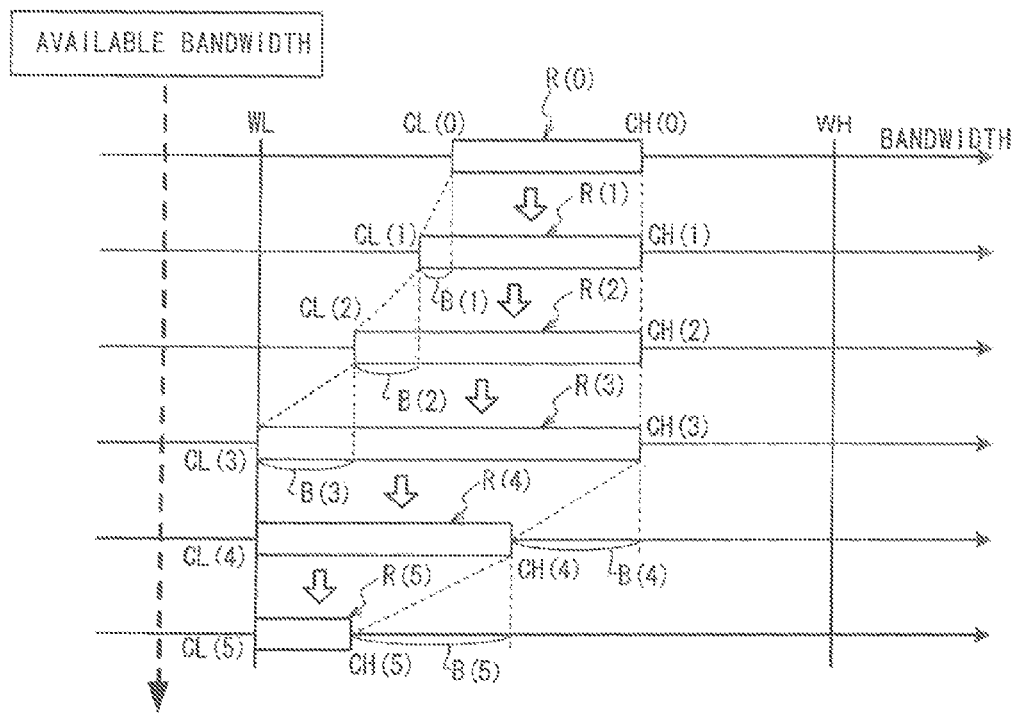
FIG. 5 is a diagram showing a manner in which the measurement bandwidth range varies in a first modified example.

FIG. 5 shows a case in which the available bandwidth is located on the narrowband side with respect to the lower threshold value WL. However, also in a case where the available bandwidth is located on the wideband side with respect to the upper threshold value WH, the measurement bandwidth range R (n) is updated using a method similar to the above-described method.

Figure 6:
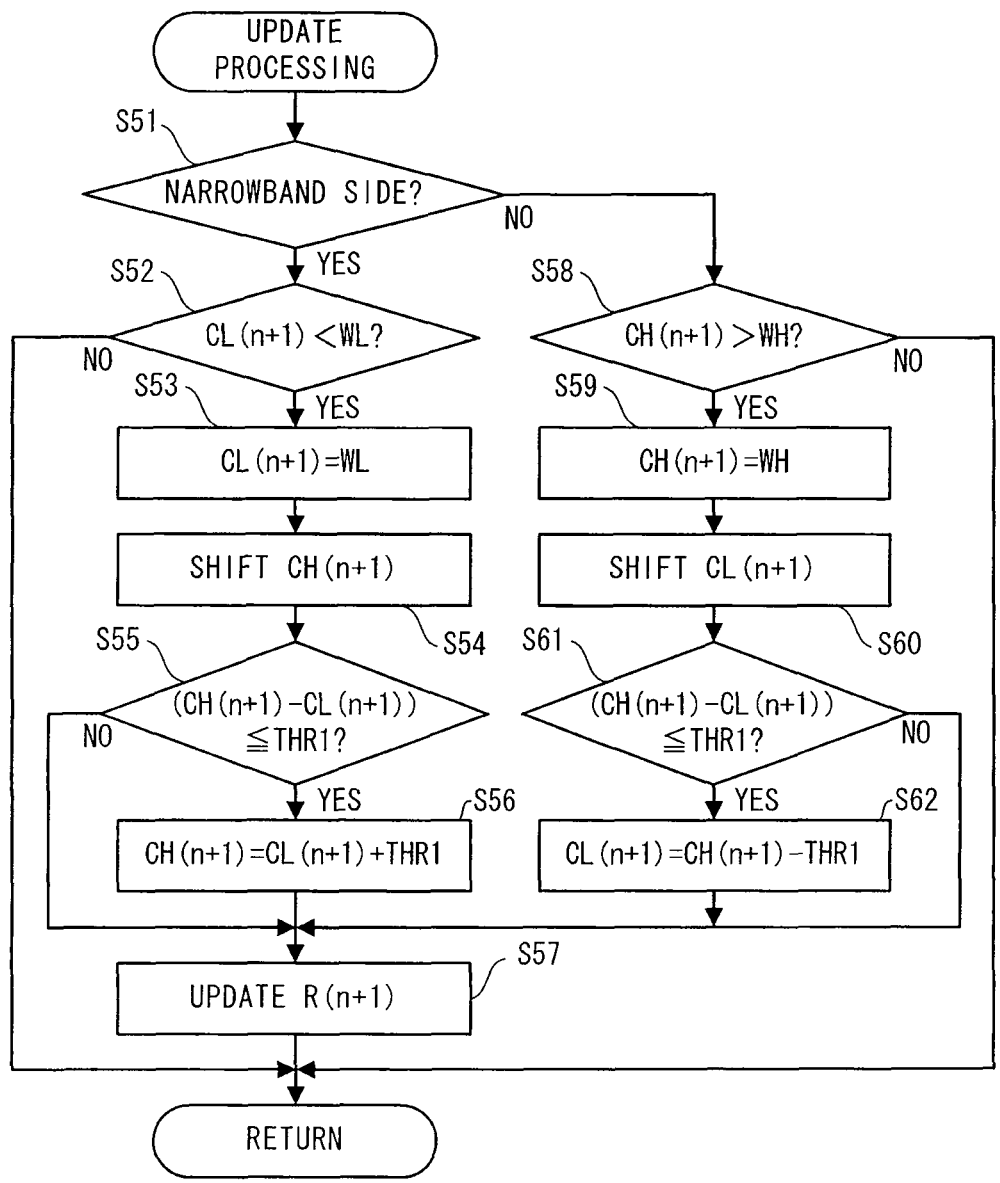
FIG. 6 is a flowchart showing update processing in the first modified example.

Update processing in the first modified embodiment will be described with reference to FIG. 6. The update processing is called from the main processing shown in FIG. 3. Main processing in the first modified embodiment is the same as that of the above-described embodiment. In the main processing, the measurement bandwidth range R (n) that was used for the measurement communication has been updated to the new measurement bandwidth range R (n+1). In a case where the available bandwidth was located on the narrowband side with respect to the measurement bandwidth range R (n), the lower bandwidth CL (n) has been shifted to the narrowband side. In a case where the available bandwidth was located on the wideband side with respect to the measurement bandwidth range R (n), the upper bandwidth CH (n) has been shifted to the wideband side.

When the update processing is activated, first, it is determined whether or not the new measurement bandwidth range R (n+1) has been identified by extending the measurement bandwidth range R (n) to the narrowband side (step S51). When the new measurement bandwidth range R (n+1) has been identified by extending the measurement bandwidth range R (n) to the narrowband side (yes at step S51), it is determined whether or not the lower bandwidth CL (n+1) of the new measurement bandwidth range R (n+1) is smaller than the lower threshold value WL (step S52). In a case where the lower bandwidth CL (n+1) is equal to or larger than the lower threshold value WL (no at step S52), the update processing ends and the processing returns to the main processing (refer to FIG. 3). In a case where the lower bandwidth CL (n+1) is smaller than the lower threshold value WL (yes at step S52), the lower threshold value WL is substituted for the lower bandwidth CL (n+1), and the lower bandwidth CL (n+1) is thereby changed (step S53).

Since the lower bandwidth CL (n+1) is smaller than the lower threshold value WL, the upper bandwidth CH (n+1) is shifted to the narrowband side in the following manner (step S54). The bandwidth shift amount B (n+1) is calculated based on the upper bandwidth CH (n), the lower bandwidth CL (n) and the amount of change M (n).

$$B(n+1)=(CH(n)-CL(n))\times M(n)$$

By subtracting the calculated bandwidth shift amount B (n+1) from the upper bandwidth CH (n+1), the upper bandwidth CH (n+1) is shifted to the narrowband side by the bandwidth shift amount B (n+1).

$$CH(n+1)=CH(n+1)-B(n+1)=CH(n+1)+(CH(n)-CL(n))\times M(n)$$

It is determined whether or not the width (CH (n+1)−CL (n+1)) of the measurement bandwidth range R (n+1) is equal to or smaller than a predetermined threshold value (step S55).

Hereinafter, the predetermined threshold value is denoted by "THR1". In a case where the width (CH (n+1)–CL (n+1)) is larger than THR1 (no at step S55), the processing proceeds to step S57. In a case where the width (CH (n+1)–CL (n+1)) is equal to or smaller than THR1 (yes at step S55), the upper bandwidth CH (n+1) is changed in the following manner so that the width (CH (n+1)–CL (n+1)) becomes equal to THR1 (step S56).

$$CH(n+1)=CL(n+1)+THR1$$

Since the upper bandwidth is changed in the above-described manner, the width of the measurement bandwidth range R (n+1) is constantly equal to or larger than the predetermined threshold value THR1. Thus, the width of the measurement bandwidth range R (n+1) is sufficiently secured.

The measurement bandwidth range R (n+1) that has been updated in the main processing (refer to FIG. 3) can be updated again to the new measurement bandwidth range R (n+1) that is identified by the upper bandwidth CH (n+1) and the lower bandwidth CL (n+1) changed by the above-described processing (step S57). The update processing ends and the processing returns to the main processing (refer to FIG. 3).

On the other hand, in a case where the new measurement bandwidth range R (n+1) has been identified by extending the measurement bandwidth range R (n) to the wideband side (no at step S51), it is determined whether or not the upper bandwidth CH (n+1) of the new measurement bandwidth range R (n+1) is larger than the upper threshold value WH (step S58). In a case where the upper bandwidth CH (n+1) is equal to or smaller than the upper threshold value WH (no at step S58), the update processing ends and the processing returns to the main processing (refer to FIG. 3). In a case where the upper bandwidth CH (n+1) is larger than the upper threshold value WH (yes at step S58), the upper threshold value WH is substituted for the upper bandwidth CH (n+1), and the upper bandwidth CH (n+1) is thereby changed (step S59).

Since the upper bandwidth CH (n+1) is equal to or larger than the upper threshold value WH, the lower bandwidth CL (n+1) is shifted to the wideband side in the following manner (step S60). The bandwidth shift amount B (n+1)=(CH (n)–CL (n))×M (n) is calculated based on the upper bandwidth CH (n), the lower bandwidth CL (n) and the amount of change M (n). By adding the calculated bandwidth shift amount B (n+1) to the lower bandwidth CL (n+1), the lower bandwidth CL (n+1) is shifted to the wideband side by the bandwidth shift amount B (n+1).

$$CL(n+1)=CL(n+1)+B(n+1)=CL(n+1)+(CH(n)-CL(n))\times M(n)$$

It is determined whether or not the width (CH (n+1)–CL (n+1)) of the measurement bandwidth range R (n+1) is equal to or smaller than the predetermined threshold value THR1 (step S61). In a case where the width (CH (n+1)–CL (n+1)) is larger than THR1 (no at step S61), the processing shifts to step S57. In a case where the width (CH (n+1)–CL (n+1)) is equal to or smaller than THR1 (yes at step S61), the lower bandwidth CL (n+1) is changed in the following manner so that the width (CH (n+1)–CL (n+1)) becomes equal to THR1 (step S62).

$$CL(n+1)=CH(n+1)-THR1$$

Since the lower bandwidth is changed in the above-described manner, the width of the measurement bandwidth range R (n+1) is constantly equal to or larger than the predetermined threshold value THR1.

The new measurement bandwidth range R (n+1) that has been updated in the main processing (refer to FIG. 3) is updated again to the new measurement bandwidth range R (n+1) that is identified by the upper bandwidth CH (n+1) and the lower bandwidth CL (n+1) changed by the above-described processing (step S57). The update processing ends and the processing returns to the main processing (refer to FIG. 3).

As described above, the communication device 1 can shift the upper bandwidth to the narrowband side in a case where the lower bandwidth of the measurement bandwidth range becomes smaller than the lower threshold value. In a similar manner, the communication device 1 can shift the lower bandwidth to the wideband side in a case where the upper bandwidth of the measurement bandwidth range becomes larger than the upper threshold value. Thus, the communication device 1 can reduce the width of the measurement bandwidth range. Therefore, the communication device 1 can reduce the time required for the measurement communication performed based on the measurement bandwidth range. Further, the bandwidth that has already been measured can be removed from the measurement bandwidth range, and it is unlikely that the same bandwidth is measured more than once. Therefore, the communication device 1 can efficiently measure the available bandwidth. In addition, since the measurement bandwidth range is held in a location close to the available bandwidth, if the available bandwidth varies and the available bandwidth shifts to be within the range between the lower threshold value and the upper threshold value, the communication device 1 can quickly detect the available bandwidth.

Note that, in the first modified embodiment, the bandwidth shift amount of the upper bandwidth in a case where the lower bandwidth of the measurement bandwidth range becomes smaller than the lower threshold value, and the bandwidth shift amount of the lower bandwidth in a case where the upper bandwidth of the measurement bandwidth range becomes larger than the upper threshold value are determined based on the amount of change. However, the bandwidth shift amount in these cases may be determined uniformly. Alternatively, the bandwidth shift amount may be determined such that it becomes smaller each time the measurement communication is repeated. Thus, the communication device 1 according to the first modified embodiment can inhibit the width of the measurement bandwidth range from being rapidly reduced.

Second Modified Embodiment

Hereinafter, a second modified embodiment of the present disclosure will be described. In the second modified embodiment, in a case where it is determined at least twice continuously that the available bandwidth is located on the narrowband side or the wideband side with respect to the measurement bandwidth range R (n), the communication device 1 causes both the lower bandwidth CL (n) and the upper bandwidth CH (n) of the measurement bandwidth range R (n) to shift by a same amount. As a result, while maintaining the width of the measurement bandwidth range R (n), the communication device 1 causes the whole measurement bandwidth range R (n) to shift to the narrowband side or to the wideband side.

A method for updating the measurement bandwidth range R (n) in a case where the available bandwidth is located on the narrowband side with respect to the measurement bandwidth range R (0) will be described with reference to FIG. 7. The transmission device identifies the measurement bandwidth range R (0). A plurality of measurement bandwidths are selected from within the measurement bandwidth range R (0). The measurement communication is performed based on the selected measurement bandwidths and it is attempted to identify the available bandwidth. It is determined that the available bandwidth is located on the narrowband side with respect to the measurement bandwidth range R (0). The lower bandwidth CL (0) of the measurement bandwidth range R (0) is shifted to the narrowband side by the bandwidth shift amount B (1). The upper bandwidth CH (0) is not changed and is maintained as it is. The measurement bandwidth range is updated to the measurement bandwidth range R (1) obtained by extending the measurement bandwidth range R (0) to the narrowband side by the bandwidth shift amount B (1). The processing so far is the same as that of the above-described embodiment.

The measurement communication is performed based on the updated measurement bandwidth range R (1), and again, it is determined that the available bandwidth is located on the narrowband side with respect to the measurement bandwidth range R (1). Therefore, it has been determined twice continuously that the available bandwidth is located on the narrowband side with respect to the measurement bandwidth range R (1). The lower bandwidth CL (1) and the upper bandwidth CH (1) of the measurement bandwidth range R (1) are shifted to the narrowband side by the bandwidth shift amount B (2). The measurement bandwidth range is updated to the measurement bandwidth range R (2) that is obtained by shifting the measurement bandwidth range R (1) to the narrowband side by the bandwidth shift amount B (2) while maintaining the width of the measurement bandwidth range R (1). The measurement communication is performed based on the measurement bandwidth range R (2), and it is attempted to identify the available bandwidth. The processing similar to the above-described processing is repeated, and the measurement bandwidth range is further updated to the measurement bandwidth range R (3) that is obtained by shifting the measurement bandwidth range R (2) to the narrowband side by the bandwidth shift amount B (3) while maintaining the width of the measurement bandwidth range R (2). Since the available bandwidth is included in the measurement bandwidth range R (3), the communication device 1 identifies the available bandwidth.

Figure 7:
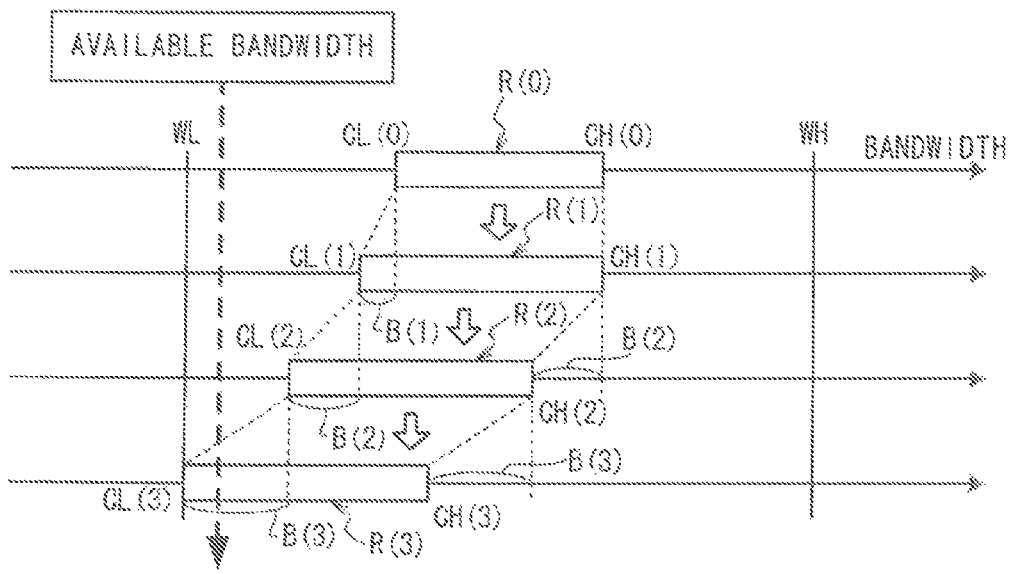
FIG. 7 is a diagram showing a manner in which the measurement bandwidth range varies in a second modified example.

FIG. 7 shows a case in which the available bandwidth is located on the narrowband side with respect to the measurement bandwidth range R (0). However, also in a case where the available bandwidth is located on the wideband side with respect to the measurement bandwidth range R (0), the measurement bandwidth range R (n) is updated using a method similar to the above-described method.

Figure 8:
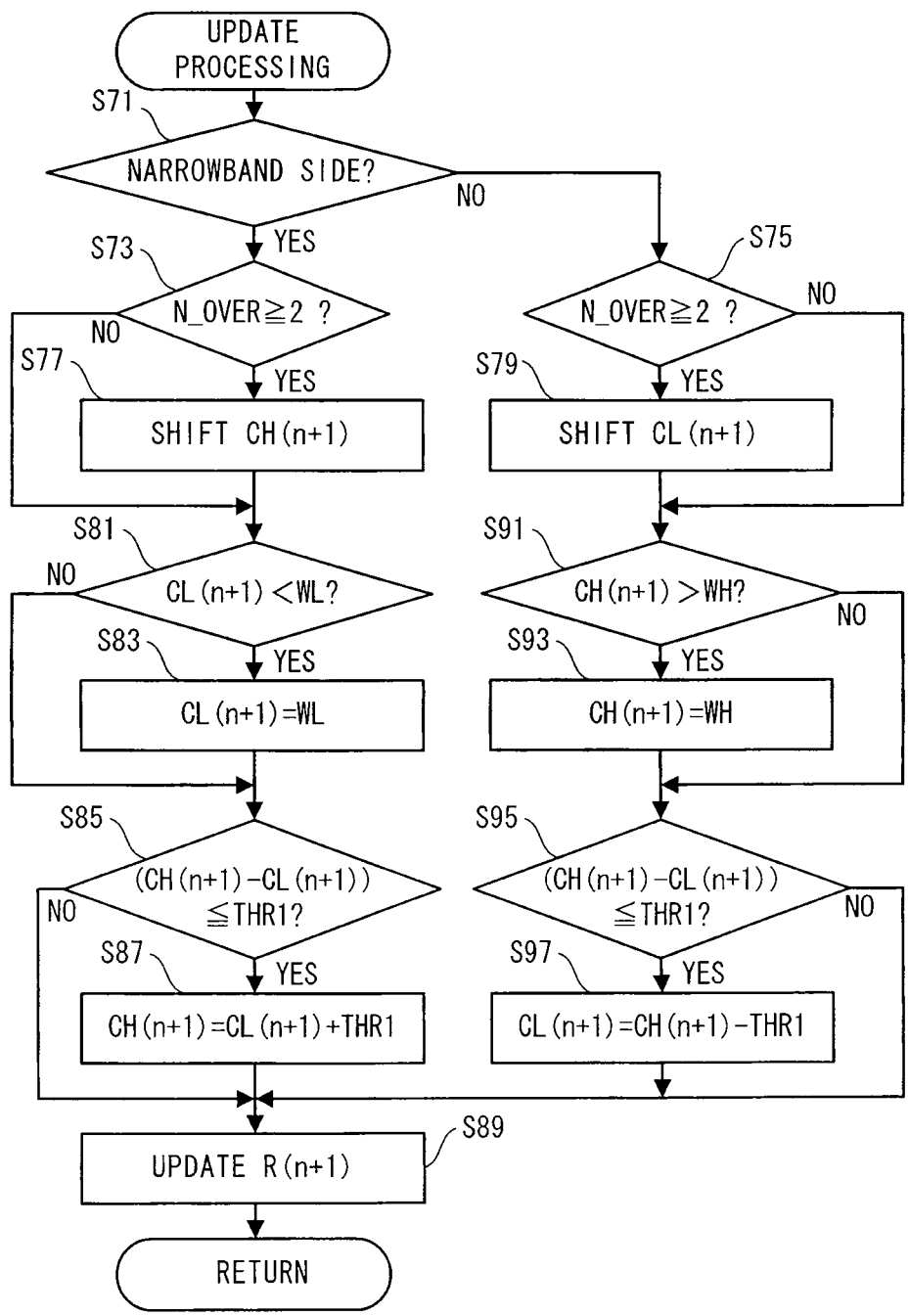
FIG. 8 is a flowchart showing update processing in the second modified example.

Update processing in the second modified embodiment will be described with reference to FIG. 8. The update processing is called from the main processing shown in FIG. 3. Main processing in the second modified embodiment is the same as that of the above-described embodiment. In the main processing, the measurement bandwidth range R (n) used for the measurement communication has been updated to the new measurement bandwidth range R (n+1). In a case where the available bandwidth was located on the narrowband side with respect to the measurement bandwidth range R (n), the lower bandwidth CL (n) has been shifted to the narrowband side. In a case where the available bandwidth is located on the wideband side with respect to the measurement bandwidth range R (n), the upper bandwidth CH (n) has been shifted to the wideband side.

When the update processing is activated, first, it is determined whether or not the new measurement bandwidth range R (n+1) has been identified by extending the measurement bandwidth range R (n) to the narrowband side (step S71). In a case where the new measurement bandwidth range R (n+1) has been identified by extending the measurement bandwidth range R (n) to the narrowband side (yes at step S71), it is determined whether or not the variable N_OVER is equal to or larger than 2 (step S73). If the variable N_OVER is equal to or smaller than 1 (no at step S73), the processing proceeds to step S81.

If the variable N_OVER is equal to or larger than 2 (yes at step S73), it means that it has been determined at least twice continuously that the available bandwidth is located on the narrowband side with respect to the measurement bandwidth range. In this case, the upper bandwidth CH (n+1) is shifted in the following manner (step S77).

In a case where the measurement bandwidth range R (n) has been updated to the new measurement bandwidth range R (n+1) in the main processing (refer to FIG. 3), the bandwidth shift amount B (n+1) of the lower bandwidth CL (n) to the narrowband side is identified in the following manner.

$$B(n+1)=(CH(n)-CL(n)) \times M(n)$$

The upper bandwidth CH (n) is shifted to the narrowband side by the identified bandwidth shift amount B (n+1).

$$CH(n+1)=CH(n)-B(n+1)=CH(n)-(CH(n)-CL(n)) \times M(n)$$

Thus, the new measurement bandwidth range R (n+1) is obtained by shifting the measurement bandwidth range R (n) to the narrowband side by the bandwidth shift amount B (n+1) while maintaining the width of the measurement bandwidth range R (n).

It is determined whether or not the lower bandwidth CL (n+1) of the measurement bandwidth range R (n+1) is smaller than the lower threshold value WL (step S81). In a case where the lower bandwidth CL (n+1) is equal to or larger than the lower threshold value WL (no at step S81), the processing proceeds to step S85. In a case where the lower bandwidth CL (n+1) is smaller than the lower threshold value WL (yes at step S81), the lower threshold value WL is substituted for the lower bandwidth CL (n+1), and the lower bandwidth CL (n+1) is thereby changed (step S83).

It is determined whether or not the width (CH (n+1)−CL (n+1)) of the measurement bandwidth range R (n+1) is equal to or smaller than the predetermined threshold value THR1 (step S85). In a case where the width (CH (n+1)−CL (n+1)) is larger than THR1 (no at step S85), the processing proceeds to step S89. In a case where the width (CH (n+1)−CL (n+1)) is equal to or smaller than THR1 (yes at step S85), the upper bandwidth CH (n+1) is changed in the following manner so that the width (CH (n+1)−CL (n+1)) becomes equal to THR1 (step S87).

$$CH(n+1)=CL(n+1)+THR1$$

The new measurement bandwidth range R (n+1) that has been updated in the main processing (refer to FIG. 3) is updated again to the new measurement bandwidth range R (n+1) that is identified by the upper bandwidth CH (n+1) and the lower bandwidth CL (n+1) changed by the above-described processing (step S89). The update processing ends and the processing returns to the main processing (refer to FIG. 3).

On the other hand, in a case where the new measurement bandwidth range R (n+1) updated in the main processing has been identified by extending the measurement bandwidth range R (n) to the wideband side (no at step S71), it is determined whether or not the variable N_OVER is equal to or larger than 2 (step S75). If the variable N_OVER is equal to or smaller than 1 (no at step S75), the processing proceeds to step S91.

If the variable N_OVER is equal to or larger than 2 (yes at step S75), it means that it has been determined at least twice continuously that the available bandwidth is located on the wideband side with respect to the measurement bandwidth range. In this case, the lower bandwidth CL (n+1) is shifted in the following manner (step S79).

In a case where the measurement bandwidth range R (n) has been updated to the new measurement bandwidth range R (n+1) in the main processing (refer to FIG. 3), the bandwidth shift amount B (n+1)=(CH (n)–CL (n))×M (n) of the upper bandwidth CH (n) to the wideband side is identified. The lower bandwidth CL (n) is shifted to the wideband side by the identified bandwidth shift amount B (n+1).

$$CL(n+1)=CL(n)+B(n+1)=CL(n)+(CH(n)-CL(n))\times M(n)$$

Thus, the new measurement bandwidth range R (n+1) is obtained by shifting the measurement bandwidth range R (n) to the wideband side by the bandwidth shift amount B (n+1) while maintaining the width of the measurement bandwidth range R (n).

It is determined whether or not the upper bandwidth CH (n+1) of the new measurement bandwidth range R (n+1) is larger than the upper threshold value WH (step S91). In a case where the upper bandwidth CH (n+1) is equal to or smaller than the upper threshold value WH (no at step S91), the processing proceeds to step S95. In a case where the upper bandwidth CH (n+1) is larger than the upper threshold value WH (yes at step S91), the upper threshold value WH is substituted for the upper bandwidth CH (n+1), and the upper bandwidth CH (n+1) is thereby changed (step S93).

It is determined whether or not the width (CH (n+1)–CL (n+1)) of the new measurement bandwidth range R (n+1) is equal to or smaller than the predetermined threshold value THR1 (step S95). In a case where the width (CH (n+1)–CL (n+1)) is larger than THR1 (no at step S95), the processing shifts to step S89. In a case where the width (CH (n+1)–CL (n+1)) is equal to or smaller than THR1 (yes at step S95), the lower bandwidth CL (n+1) is changed in the following manner so that the width (CH (n+1)–CL (n+1)) becomes equal to THR1 (step S97).

$$CL(n+1)=CH(n+1)-THR1$$

The new measurement bandwidth range R (n+1) that has been updated in the main processing (refer to FIG. 3) is updated again to the new measurement bandwidth range R (n+1) that is identified by the upper bandwidth CH (n+1) and the lower bandwidth CL (n+1) changed by the above-described processing (step S89). The update processing ends and the processing returns to the main processing (refer to FIG. 3).

As described above, in a case where it has been determined at least twice continuously that the available bandwidth is located on the narrowband side with respect to the measurement bandwidth range, the lower bandwidth and the upper bandwidth are shifted to the narrowband side by a same bandwidth shift amount. In a similar manner, in a case where it has been determined at least twice continuously that the available bandwidth is located on the wideband side with respect to the measurement bandwidth range, the lower bandwidth and the upper bandwidth are shifted to the wideband side by a same bandwidth shift amount. The width of the measurement bandwidth range is not extended and a difference between the lower bandwidth and the upper bandwidth does not change. Thus, the communication device 1 can inhibit an increase in time required for measurement communication due to an excessively wide width of the measurement bandwidth range. The communication device 1 can rapidly perform the measurement communication in the measurement bandwidth range in a relatively short time.

Further, in the main processing, the amount of change gradually increases in accordance with an increase of the continuous number of times in a case where it is continuously determined that the available bandwidth is located on the narrowband side or the wideband side with respect to the measurement bandwidth range. Accordingly, in the above-described embodiment, the width of the measurement bandwidth range rapidly increases. In contrast to this, in the second modified embodiment, the width of the measurement bandwidth range can be fixed and the whole measurement bandwidth range can be shifted to the narrowband side or to the wideband side. Thus, the communication device 1 can further reduce the time necessary for measurement communication.

In the second modified embodiment, both the lower bandwidth and the upper bandwidth are shifted in a case where it has been determined twice continuously that the available bandwidth is located on the narrowband side or the wideband side with respect to the measurement bandwidth range. However, a threshold value for the continuous number of times may be three or more.

In the second modified embodiment, in a case where it has been determined at least a predetermined number of times continuously that the available bandwidth is located on the narrowband side or the wideband side with respect to the measurement bandwidth range, the bandwidth shift amount is determined based on the amount of change. However, in the second modified embodiment, the bandwidth shift amount may be determined uniformly after it has been determined the predetermined number of times continuously that the available bandwidth is located on the narrowband side or the wideband side with respect to the measurement bandwidth range.

Third Modified Embodiment

Hereinafter, a third modified embodiment will be described. In the third modified embodiment, in a case where the width (CH (n+1)–CL (n+1)) of the new measurement bandwidth range R (n+1) that has been updated in the main processing (refer to FIG. 3) is equal to or larger than a predetermined threshold value, the width of the new measurement bandwidth range R (n+1) is reduced. Hereinafter, the predetermined threshold value is also referred to as "THR2". This can inhibit the width of the measurement bandwidth range R (n) from becoming excessively wide. Parts of processing that are the same as those of the above-described second modified embodiment are denoted by the same reference numerals and a description thereof is omitted.

Figure 9:
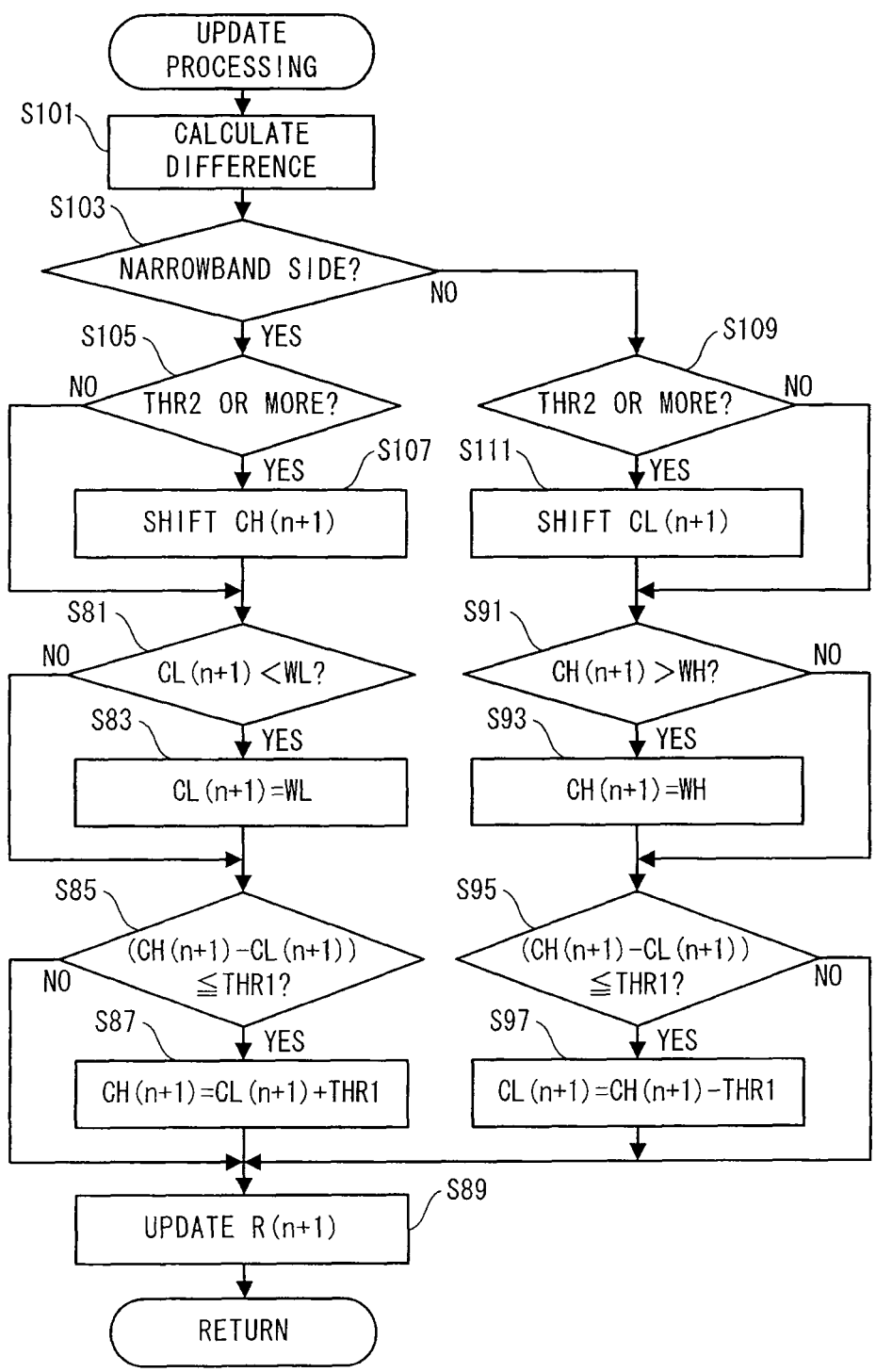
FIG. 9 is a flowchart showing update processing in a third modified example.

Update processing in the third modified embodiment will be described with reference to FIG. 9. The update processing is called from the main processing shown in FIG. 3. Main processing in the third modified embodiment is the same as that of the above-described embodiment. In the main processing, the measurement bandwidth range R (n) that was used for the measurement communication has been updated to the new measurement bandwidth range R (n+1). In a case where the available bandwidth was located on the narrowband side with respect to the measurement bandwidth range R (n), the lower bandwidth CL (n) has been shifted to the narrowband side. In a case where the available bandwidth was located on the wideband side with respect to the measurement bandwidth range R (n), the upper bandwidth CH (n) has been shifted to the wideband side.

In a case where the update processing is activated, first, a difference between the upper bandwidth CH (n+1) and the lower bandwidth CL (n+1) of the new measurement bandwidth range R (n+1) updated in the main processing (refer to FIG. 3) is calculated (step S101). As a result, the width (CH (n+1)−CL (n+1)) of the new measurement bandwidth range R (n+1) is identified.

It is determined whether or not the new measurement bandwidth range R (n+1) has been identified by extending the measurement bandwidth range R (n) to the narrowband side (step S103). In a case where the new measurement bandwidth range R (n+1) has been identified by extending the measurement bandwidth range R (n) to the narrowband side (yes at step S103), it is determined whether or not the width (CH (n+1)−CL (n+1)) calculated at step S101 is equal to or larger than THR2 (step S105). In a case where the width (CH (n+1)−CL (n+1)) is equal to or larger than THR2 (yes at step S105), the upper bandwidth CH (n+1) is shifted to the narrowband side by the bandwidth shift amount B (n+1) (step S107). The bandwidth shift amount B (n+1) is the same as that in a case where the lower bandwidth CL (n) was shifted to the narrowband side in the main processing (refer to FIG. 3). The processing shifts to step S81. On the other hand, in a case where the width (CH (n+1)−CL (n+1)) is smaller than THR2 (no at step S105), the processing shifts to step S81. The processing at step S81, step S83, step S85, step S87 and step S89 is the same as that of the second modified embodiment.

In a case where the new measurement bandwidth range R (n+1) has been identified by extending the measurement bandwidth range R (n) to the wideband side (no at step S103), it is determined whether or not the width (CH (n+1)−CL (n+1)) calculated at step S101 is equal to or larger than THR2 (step S109). In a case where the width (CH (n+1)−CL (n+1)) is equal to or larger than THR2 (yes at step S109), the lower bandwidth CL (n+1) is shifted to the wideband side by the bandwidth shift amount B (n+1) (step S111). The bandwidth shift amount B (n+1) is the same as that when the upper bandwidth CH (n) was shifted to the wideband side in the main processing (refer to FIG. 3). The processing shifts to step S91. On the other hand, in a case where the width (CH (n+1)−CL (n+1)) is smaller than THR2 (no at step S109), the processing shifts to step S91. The processing at step S91, step S93, step S95, step S97 and step S89 is the same as that of the second modified embodiment.

As described above, in a case where the difference between the upper bandwidth and the lower bandwidth is equal to or larger than the predetermined threshold value THR2, the communication device 1 adjusts the upper bandwidth or the lower bandwidth so that the width of the measurement bandwidth range does not increase any more. As a result, even in a case where there is a clear limit on the time during which the measurement communication can be performed, the communication device 1 can perform the measurement communication reliably within the time during which the measurement communication can be performed.

Fourth Modified Embodiment

Hereinafter, a fourth modified embodiment will be described. In the fourth modified embodiment, a deviation of the available bandwidth is calculated based on a history of the available bandwidth identified by the measurement communication. The unit of the deviation is a percentage. The amount of change M (n) is identified based on the calculated deviation. In a case where there is a large variation of the available bandwidth, the communication device 1 can extend increase the measurement bandwidth range R (n). Since the communication device 1 can increase the possibility that the available bandwidth is included in the measurement bandwidth range R (n), the communication device 1 can identify the available bandwidth accurately.

Figure 10:
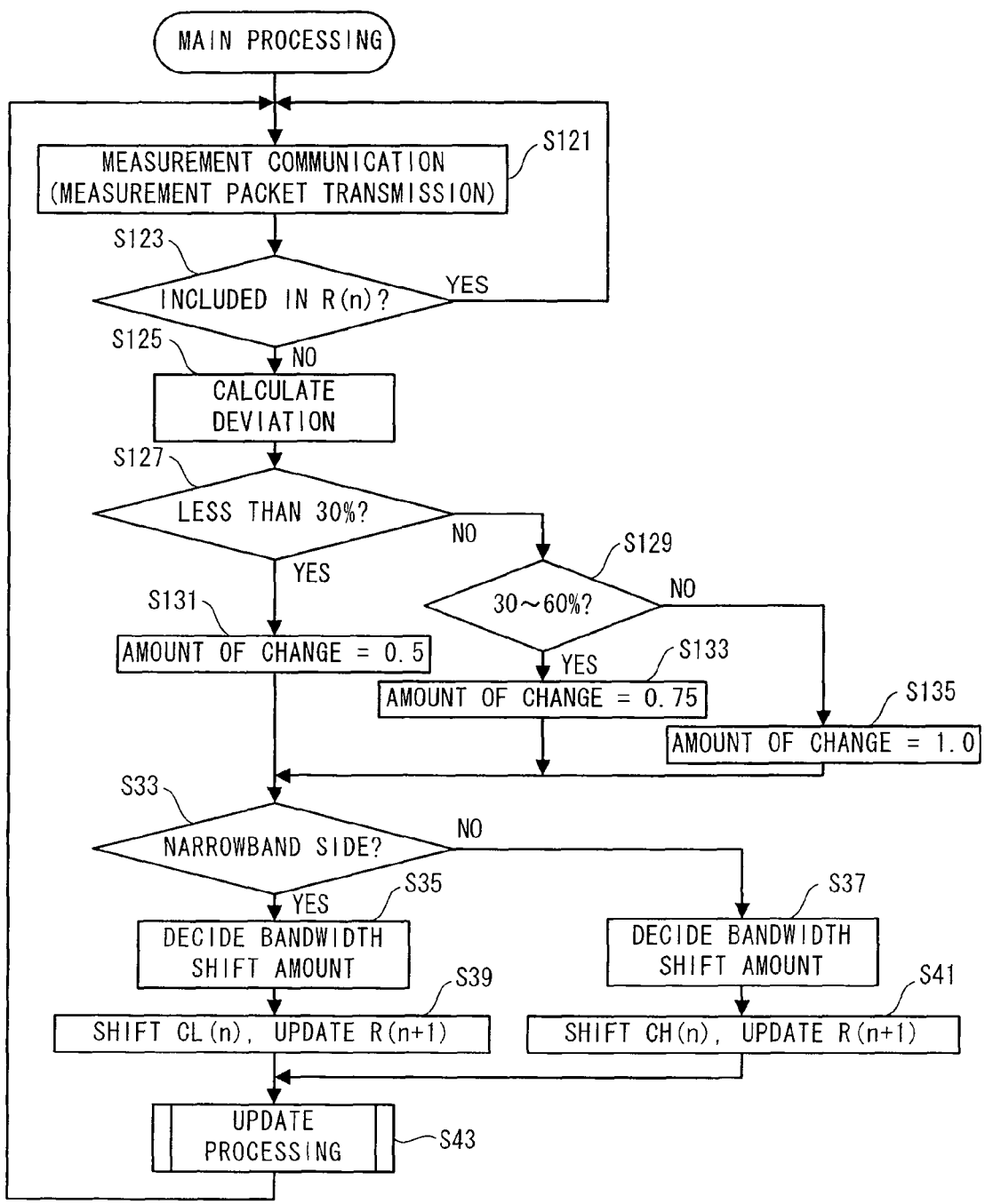
FIG. 10 is a flowchart showing main processing in a fourth modified example.

Main processing in the fourth modified embodiment will be described with reference to FIG. 10. The main processing is performed by the CPU 10 of the transmission device among the communication devices 1. Parts of processing that are the same as those of the above-described embodiment are denoted by the same reference numerals and a description thereof is omitted. When the main processing is activated, first, the measurement bandwidth range R (n) is identified and the measurement communication is performed. A result packet transmitted from the reception device is received. Information relating to the available bandwidth is extracted from the result packet. The available bandwidth is identified from the extracted information and the identified available bandwidth is stored in the HDD 13 as history information (step S121).

Based on the information stored in the HDD 13, it is determined whether or not the available bandwidth is included in the measurement bandwidth range R (n) (step S123). In a case where it is determined that the available bandwidth is included in the measurement bandwidth range R (n) (yes at step S123), the processing returns to step S121. In a case where it is determined that the available bandwidth is not included in the measurement bandwidth range R (n) (no at step S123), the history information of the available bandwidths stored in the HDD 13 is extracted and the deviation of the available bandwidth is calculated (step S125)

The amount of change M (n) is identified based on the calculated deviation. In a case where the deviation is less than 30 percent (yes at step S127), 0.5 is substituted for the amount of change M (n) (step S131). The processing shifts to step S33. In a case where the deviation is 30 percent or more and less than 60 percent (no at step S127 and yes at step S129), 0.75 is substituted for the amount of change M (n) (step S133). The processing shifts to step S33. In a case where the deviation is 60 percent or more (no at step S129), 1.0 is substituted for the amount of change M (n) (step S135). The processing shifts to step S33. The processing at step S33, step S35, step S37, step S39, step S41 and step S43 is the same as that of the above-described embodiment. At step S43, one of the update processings (refer to FIG. 4, FIG. 6, FIG. 8 and FIG. 9) of the above-described embodiment, the first modified embodiment, the second modified embodiment and the third modified embodiment is called.

As described above, in the fourth modified embodiment, the larger the deviation of the measurement results is and the larger the variation of the measurement results of the available bandwidth is, the larger the amount of change is. Thus, the communication device 1 can increase the measurement bandwidth range in a relatively short time. Accordingly, even in a case where there is a variation in the measurement results of the available bandwidth, the communication device 1 can accurately identify the available bandwidth.

Note that, in the above description, the amount of change M (n) is determined based on the deviation of the available bandwidths. However, the present disclosure is not limited to this embodiment. The amount of change M (n) may be decided based on another parameter that indicates a degree of dispersion (variation) of the available bandwidth.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication device comprising:

a processor, and a memory storing computer-readable instructions, the instructions, when executed by the processor, cause the device to perform processes comprising:

a transmission operation that, every time a measurement bandwidth range is identified or updated, transmits a plurality of measurement packets for identifying an available bandwidth to another communication device connected via a network, using bandwidth in the measurement bandwidth range, the measurement bandwidth range being a bandwidth range that is measured by the plurality of measurement packets, and the available bandwidth being bandwidth that is available in the network;

a first determining operation determining whether the available bandwidth is included in the measurement bandwidth range;

a second determining operation that, in a case where the first determining operation has determined that the available bandwidth is not included in the measurement bandwidth range, determines whether the available bandwidth is located on a narrowband side or on a wideband side with respect to the measurement bandwidth range, wherein the narrowband side with respect to the measurement bandwidth range corresponds to a lower bit rate relative to a bit rate of the wideband side;

a shift amount determining operation determining a bandwidth shift amount based on an amount of change that is larger than the amount of change at a previous time by an increment, in a case where the first determining operation has continuously determined that the available bandwidth is not included in the measurement bandwidth range and the second determining operation has continuously determined that the available bandwidth is located on one of the wideband side and the narrowband side with respect to the measurement bandwidth range, the bandwidth shift amount being a first amount of bandwidth shift when a lower bandwidth is shifted to the narrowband side when the second determining operation has determined that the available bandwidth is located on the narrowband side with respect to the measurement bandwidth range, and the bandwidth shift amount being a second amount of bandwidth shift when an upper bandwidth is shifted to the wideband side when the second determining operation has determined that the available bandwidth is located on the wideband side with respect to the measurement bandwidth range, the amount of change indicating a magnitude of change in a case where the measurement bandwidth range is changed, the lower bandwidth being a narrowest bandwidth in the measurement bandwidth range, the upper bandwidth being a widest bandwidth in the measurement bandwidth range, and the increment being larger in a case where the second determining operation has continuously determined that the available bandwidth is located on the narrowband side with respect to the measurement bandwidth range, than in a case where the second determining operation has continuously determined that the available bandwidth is located on the wideband side with respect to the measurement bandwidth range; and a first updating operation updating the measurement bandwidth range by shifting one of the lower bandwidth and the upper bandwidth based on the bandwidth shift amount determined by the shift amount determining operation.

2. The communication device according to claim 1, wherein the computer-readable instructions further cause the communication device to perform processes comprising:

a second updating operation updating the measurement bandwidth range by shifting the upper bandwidth to the narrowband side in a case where the lower bandwidth has become smaller than a predetermined lower threshold value, and by shifting the lower bandwidth to the wideband side in a case where the upper bandwidth has become larger than a predetermined upper threshold value, as a result of the first updating operation shifting the one of the lower bandwidth and the upper bandwidth.

3. The communication device according to claim 1, wherein the computer-readable instructions further cause the communication device to perform processes comprising:

an identifying operation identifying a number of continuous times in a case where the first determining operation has continuously determined that the available bandwidth is not located in the measurement bandwidth range and the second determining operation has continuously determined that the available bandwidth is located on one of the wideband side and the narrowband side with respect to the measurement bandwidth range; and a third updating operation, in a case where the number of continuous times identified by the identifying operation is equal to or more than a predetermined number of times, updating the measurement bandwidth range by shifting, in a case where the first updating operation has shifted the lower bandwidth to the narrowband side by the bandwidth shift amount, the upper bandwidth to the narrowband side by the bandwidth shift amount, and by shifting, in a case where the first updating operation has shifted the upper bandwidth to the wideband side by the bandwidth shift amount, the lower bandwidth to the wideband side by the bandwidth shift amount.

4. The communication device according to claim 1, wherein the computer-readable instructions further cause the communication device to perform processes comprising:

a first calculating operation calculating a difference between the upper bandwidth and the lower bandwidth; and a fourth updating operation that, in a case where the difference, which is calculated by the first calculating operation, is equal to or more than a predetermined value, updates the measurement bandwidth range by shifting, in a case where the first updating operation has shifted the lower bandwidth to the narrowband side by a first bandwidth shift amount, the upper bandwidth to the narrowband side by the first bandwidth shift amount, and by shifting, in a case where the first updating operation has shifted the upper bandwidth to the wideband side by a second bandwidth shift amount, the lower bandwidth to the wideband side by the second bandwidth shift amount.

5. The communication device according to claim 1, wherein the computer-readable instructions further cause the communication device to perform processes comprising:
a storage operation storing, in a storage portion, available bandwidths that have been identified and received from the other communication device; and
a second calculating operation calculating a deviation of the available bandwidths stored in the storage operation, wherein
in a case where the deviation calculated by the second calculating operation is larger, the shift amount determining operation determines the bandwidth shift amount based on the amount of change that is larger than in a case where the deviation is smaller.

6. A non-transitory computer-readable medium storing computer readable instructions, the instructions, when executed a processor of a communication device, causing the communication device to perform processes comprising:
a transmitting operation that, every time a measurement bandwidth range is one of identified and updated, transmits a plurality of measurement packets for identifying an available bandwidth to another communication device connected via a network, using bandwidth in the measurement bandwidth range, the measurement bandwidth range being a bandwidth range that is measured by the plurality of measurement packets, and the available bandwidth being bandwidth that is available in the network;
a first determining operation determining whether the available bandwidth is included in the measurement bandwidth range;
a second determining operation that, in a case where the first determining operation has determined that the available bandwidth is not included in the measurement bandwidth range, determines whether the available bandwidth is located on a narrowband side or on a wideband side with respect to the measurement bandwidth range, wherein the narrowband side with respect to the measurement bandwidth range corresponds to a lower bit rate relative to a bit rate of the wideband side;
a shift amount determining operation determining a bandwidth shift amount based on an amount of change that is larger than the amount of change at a previous time by a first increment that is larger than a second increment, in a case where the first determining operation has continuously determined that the available bandwidth is not included in the measurement bandwidth range and the second determining operation has continuously determined that the available bandwidth is located on one of the wideband side and the narrowband side with respect to the measurement bandwidth range, the bandwidth shift amount being a first amount of bandwidth shift when a lower bandwidth is shifted to the narrowband side when the second determining operation has determined that the available bandwidth is located on the narrowband side with respect to the measurement bandwidth range, and being second amount of bandwidth shift when an upper bandwidth is shifted to the wideband side when the second determining operation has determined that the available bandwidth is located on the wideband side with respect to the measurement bandwidth range, the amount of change indicating a magnitude of change in a case where the measurement bandwidth range is changed, the lower bandwidth being a narrowest bandwidth in the measurement bandwidth range, the upper bandwidth being a widest bandwidth in the measurement bandwidth range, the first increment being an increment of the amount of change with respect to the amount of change at the previous time in a case where the second determining operation has continuously determined that the available bandwidth is located on the narrowband side with respect to the measurement bandwidth range, and the second increment being an increment of the amount of change with respect to the amount of change at the previous time in a case where the second determining operation has continuously determined that the available bandwidth is located on the wideband side with respect to the measurement bandwidth range; and
a first updating operation updating the measurement bandwidth range by shifting one of the lower bandwidth and the upper bandwidth based on the bandwidth shift amount determined by the shift amount determining operation.

7. The non-transitory computer-readable medium according to claim 6, wherein the instructions, when executed by the processor, further cause the communication device to perform a process comprising:
a second updating operation updating the measurement bandwidth range by shifting the upper bandwidth to the narrowband side in a case where the lower bandwidth has become smaller than a predetermined lower threshold value, and by shifting the lower bandwidth to the wideband side in a case where the upper bandwidth has become larger than a predetermined upper threshold value, as a result of the first updating operation shifting one of the lower bandwidth and the upper bandwidth.

8. The non-transitory computer-readable medium according to claim 6, wherein the instructions, when executed by the processor, further cause the communication device to perform processes comprising:
an identifying operation identifying a number of continuous times in a case where the first determining operation has continuously determined that the available bandwidth is not located in the measurement bandwidth range and the second determining operation has continuously determined that the available bandwidth is located on one of the wideband side and the narrowband side with respect to the measurement bandwidth range; and
a third updating operation that, in a case where the number of continuous times identified by the identifying operation is equal to or more than a predetermined number of times, updates the measurement bandwidth range by shifting, in a case where the first updating operation has shifted the lower bandwidth to the narrowband side by the bandwidth shift amount, the upper bandwidth to the narrowband side by the bandwidth shift amount, and by shifting, in a case where the first updating operation has shifted the upper bandwidth to the wideband side by the bandwidth shift amount, the lower bandwidth to the wideband side by the bandwidth shift amount.

9. The non-transitory computer-readable medium according to claim 6, wherein the instructions, when executed by the processor, further cause the communication device to perform processes comprising:
a first calculating operation calculating a difference between the upper bandwidth and the lower bandwidth; and
a fourth updating operation, in a case where the difference, which is calculated by the first calculating operation is equal to or more than a predetermined value, updating the measurement bandwidth range by shifting, in a case where the first updating operation has shifted the lower bandwidth to the narrowband side by a first bandwidth shift amount, the upper bandwidth to the narrowband side by the first bandwidth shift amount, and by shifting, in a case where the first updating operation has shifted the upper bandwidth to the wideband side by a second bandwidth shift amount, the lower bandwidth to the wideband side by the second bandwidth shift amount.

10. The non-transitory computer-readable medium according to claim 6, wherein the instructions, when executed by the processor, further cause the communication device to perform processes comprising:
   a storing operation storing, in a storage portion, available bandwidths that have been identified and received from the other communication device; and
   a second calculating operation calculating a deviation of the available bandwidths stored in the storage portion, wherein
   in a case where the deviation calculated by the second calculating operation is larger, the shift amount determining operation determines the bandwidth shift amount based on the amount of change that is larger than in a case where the deviation is smaller.

11. A non-transitory computer-readable medium storing computer readable instructions, the instructions, when executed by a processor of a communication device, cause the communication device to perform processes comprising:
   a transmitting operation that, every time a measurement bandwidth range is one of identified and updated, transmits a plurality of measurement packets for identifying an available bandwidth to another communication device connected via a network, using bandwidth in the measurement bandwidth range, the measurement bandwidth range being a bandwidth range that is measured by the plurality of measurement packets, and the available bandwidth being bandwidth that is available in the network;
   a first determining operation determining whether the available bandwidth is included in the measurement bandwidth range;
   a second determining operation, in a case where the first determining operation has determined that the available bandwidth is not included in the measurement bandwidth range, determining whether the available bandwidth is located on a narrowband side or on a wideband side with respect to the measurement bandwidth range, wherein the narrowband side with respect to the measurement bandwidth range corresponds to a lower bit rate relative to a bit rate of the wideband side;
   a shift amount determining operation determining a bandwidth shift amount based on an amount of change that is larger than the amount of change at a previous time, in a case where the first determining operation has continuously determined that the available bandwidth is not included in the measurement bandwidth range and the second determining operation has continuously determined that the available bandwidth is located on one of the wideband side and the narrowband side with respect to the measurement bandwidth range, the bandwidth shift amount being a first amount of bandwidth shift when a lower bandwidth is shifted to the narrowband side when the second determining operation has determined that the available bandwidth is located on the narrowband side with respect to the measurement bandwidth range, and being a second amount of bandwidth shift when an upper bandwidth is shifted to the wideband side when the second determining operation has determined that the available bandwidth is located on the wideband side with respect to the measurement bandwidth range, the amount of change indicating a magnitude of change in a case where the measurement bandwidth range is changed, the lower bandwidth being a narrowest bandwidth in the measurement bandwidth range, and the upper bandwidth being a widest bandwidth in the measurement bandwidth range;
   a first updating operation updating the measurement bandwidth range by shifting one of the lower bandwidth and the upper bandwidth based on the bandwidth shift amount determined by the shift amount determining operation;
   an identifying operation identifying a number of continuous times in a case where the first determining operation has continuously determined that the available bandwidth is not located in the measurement bandwidth range and the second determining operation has continuously determined that the available bandwidth is located on one of the wideband side and the narrowband side with respect to the measurement bandwidth range; and
   a second updating operation, in a case where the number of continuous times identified by the identifying operation is equal to or more than a predetermined number of times, updating the measurement bandwidth range by shifting, in a case where the first updating operation has shifted the lower bandwidth to the narrowband side by the bandwidth shift amount, the upper bandwidth to the narrowband side by the bandwidth shift amount, and by shifting, in a case where the first updating operation has shifted the upper bandwidth to the wideband side by the bandwidth shift amount, the lower bandwidth to the wideband side by the bandwidth shift amount.

12. The non-transitory computer-readable medium according to claim 11, wherein, a first increment of the amount of change with respect to the amount of change at the previous time in a case where the second determining operation has continuously determined that the available bandwidth is located on the narrowband side with respect to the measurement bandwidth range is larger than a second increment of the amount of change with respect to the amount of change of the previous time in a case where the second determining operation has continuously determined that the available bandwidth is located on the wideband side with respect to the measurement bandwidth range.

13. The non-transitory computer-readable medium according to claim 11, wherein the instructions, when executed by the processor, cause the communication device to further perform a process comprising:
   a third updating operation updating the measurement bandwidth range by shifting the upper bandwidth to the narrowband side in a case where the lower bandwidth has become smaller than a predetermined lower threshold value, and by shifting the lower bandwidth to the wideband side in a case where the upper bandwidth has become larger than a predetermined upper threshold value, as a result of the first updating operation shifting the one of the lower bandwidth and the upper bandwidth.

14. The non-transitory computer-readable medium according to claim 11, wherein the instructions, when executed by the processor, cause the communication device to further perform processes comprising:
   a first calculating operation calculating a difference between the upper bandwidth and the lower bandwidth; and
   a fourth updating operation, in a case where the difference, which is calculated by the first calculating operation is equal to or more than a predetermined value, updating the measurement bandwidth range by shifting, in a case where the first updating operation has shifted the lower bandwidth to the narrowband side by a first bandwidth shift amount, the upper bandwidth to the narrowband side by the first bandwidth shift amount, and by shifting, in a case where the first updating operation has shifted the upper bandwidth to the wideband side by a second bandwidth shift amount, the lower bandwidth to the wideband side by the second bandwidth shift amount.

15. The non-transitory computer-readable medium according to claim 11, wherein the instructions, when executed by the processor, cause the communication device to further perform a process comprising:

a storing operation storing, in a storage portion, available bandwidths that have been identified and received from the other communication device; and a second calculating operation calculating a deviation of the available bandwidths stored in the storage portion, wherein in a case where the deviation calculated by the second calculating operation is larger, the shift amount determining operation determines the bandwidth shift amount based on the amount of change that is larger than in a case where the deviation is smaller.

* * * * *

UNITED STATES PATENT AND TRADEMARK OFFICE
CERTIFICATE OF CORRECTION

Page 1 of 1

PATENT NO.        : 8,787,187 B2
APPLICATION NO.   : 13/221978
DATED             : July 22, 2014
INVENTOR(S)       : Mitsuru Nakamura et al.

It is certified that error appears in the above-identified patent and that said Letters Patent is hereby corrected as shown below:

Claims

Column 25, Claim 6, Line 17:
   Please delete "executed" and insert --executed by--.

Column 25, Claim 6, Line 57:
   Please delete "being" and insert --being a--.

Signed and Sealed this
First Day of December, 2015

Michelle K. Lee
*Director of the United States Patent and Trademark Office*